(12) United States Patent
Wamble, III et al.

(10) Patent No.: US 8,171,858 B2
(45) Date of Patent: May 8, 2012

(54) TRANSIT SYSTEM VEHICLE GUIDEWAY CONSTRUCTED FROM MODULAR ELEMENTS AND USING MAGNETIC LEVITATION FOR SUSPENSION AND PROPULSION VEHICLES

(75) Inventors: John Lee Wamble, III, Bothell, WA (US); Christopher Perkins, Westlake Village, CA (US); John V. Cole, Laguna Miguel, CA (US); Clark Foster, Mission Viejo, CA (US)

(73) Assignee: Advanced Maglev Systems, LLC, Shoreline, WA (US)

( * ) Notice: Subject to any disclaimer, the term of this patent is extended or adjusted under 35 U.S.C. 154(b) by 0 days.

(21) Appl. No.: 11/960,605

(22) Filed: Dec. 19, 2007

(65) Prior Publication Data

US 2008/0148990 A1 Jun. 26, 2008

Related U.S. Application Data

(60) Provisional application No. 60/870,886, filed on Dec. 20, 2006.

(51) Int. Cl.
*B60L 13/04* (2006.01)
(52) U.S. Cl. ......... 104/281; 104/282; 104/283; 104/284
(58) Field of Classification Search ........... 104/281–286
See application file for complete search history.

(56) References Cited

U.S. PATENT DOCUMENTS

| | | | | |
|---|---|---|---|---|
| 4,061,089 A * | 12/1977 | Sawyer | | 104/23.2 |
| 5,189,961 A * | 3/1993 | Fujie | | 104/281 |
| 5,287,026 A * | 2/1994 | Ogihara et al. | | 310/12 |
| 5,388,527 A * | 2/1995 | Thornton | | 104/284 |
| 5,682,139 A * | 10/1997 | Pradeep et al. | | 340/539.13 |
| 5,865,123 A * | 2/1999 | Powell et al. | | 104/281 |
| 5,899,036 A * | 5/1999 | Seiber et al. | | 52/241 |
| 6,510,799 B2 * | 1/2003 | Lamb et al. | | 104/281 |
| 6,570,273 B2 * | 5/2003 | Hazelton | | 310/12 |
| 6,899,036 B2 | 5/2005 | Lamb et al. | | |
| 7,204,192 B2 * | 4/2007 | Lamb et al. | | 104/282 |
| 7,334,525 B2 * | 2/2008 | Jeter et al. | | 104/124 |
| 2006/0081150 A1 * | 4/2006 | Jeter et al. | | 104/124 |
| 2008/0148990 A1 * | 6/2008 | Wamble et al. | | 104/281 |

* cited by examiner

*Primary Examiner* — S. Joseph Morano
*Assistant Examiner* — Jason C Smith
(74) *Attorney, Agent, or Firm* — Kilpatrick Townsend & Stockton LLP

(57) ABSTRACT

The networked guideway transit system uses materials and methods of constructing guideway elements. The materials and methods are designed to reduce the static weight, cost and physical size of the guideway structure. Installation cost is also significantly reduced by the modular nature of the guideway components, which can be manufactured in a controlled factory environment using mass production methods. As a result, the supporting structure of the guideway can be quickly erected and the modular blocks inserted with simple equipment. In addition, complex alignment procedures are not required. In particular, the guideway component includes motor coils having the shapes and configurations that facilitate the easy insertion of the guideway component without the need for interleaving coils in adjacent guideway components and without creating dead spots in the magnetic fields between guideway components.

20 Claims, 14 Drawing Sheets

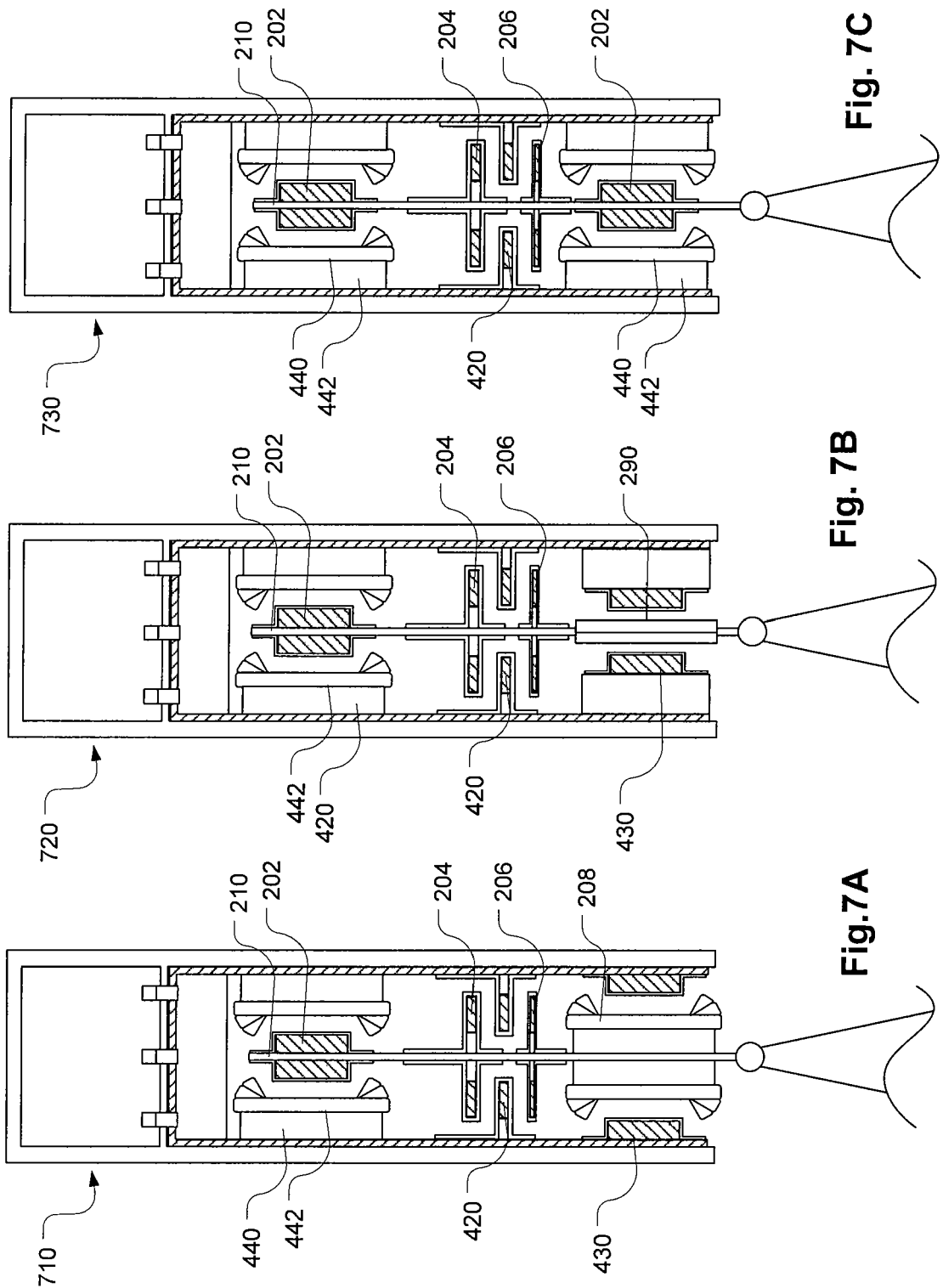

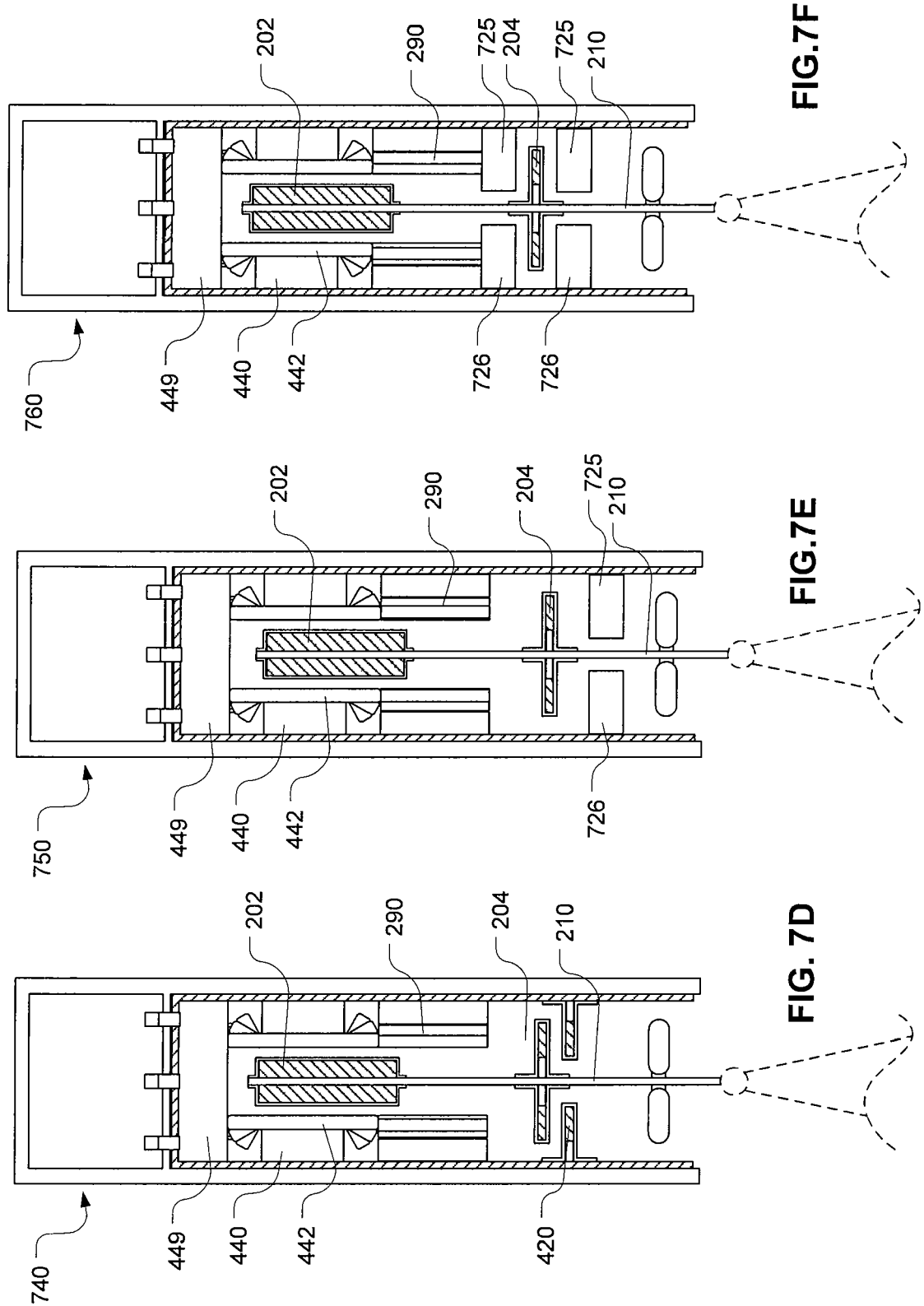

TRANSIT SYSTEM VEHICLE GUIDEWAY CONSTRUCTED FROM MODULAR ELEMENTS AND USING MAGNETIC LEVITATION FOR SUSPENSION AND PROPULSION VEHICLES

CROSS-REFERENCES TO RELATED APPLICATIONS

The present application claims benefit to U.S. provisional patent application No. 60/870,886, filed Dec. 20, 2006, the complete disclosure of which is incorporated herein by reference.

BACKGROUND

The present invention is directed to transportation or transit systems, and more specifically, to networked guideway transit systems designed to enable the movement of large numbers of passengers or parcels in a flexible manner.

Guideway-based transportation systems have been used to transport people or goods. One example is a "Personal Rapid Transit" (PRT) system. In the PRT system, each vehicle carries just one party or small group (or payload) from their origin directly to their destination, starting at a time determined by the party's arrival at its origin. Vehicles are typically piloted by computer and move non-stop along guideways with diverging and merging paths.

The PRT system can offer great advantages over other transportation technologies using transportation means such as buses, cars, trains, etc. Because PRT vehicles can be as much as two orders of magnitude smaller than a typical line-haul mass transit vehicle, the guideway structure can be much smaller as well, and can have a commensurately smaller footprint and cost per unit length. This increases the range of possible guideway locations and permits putting the guideway where it is most needed and can work best. Likewise, by virtue of a small footprint, passenger portals can be placed at locations much more convenient for users than the typical large street station of a line-haul transit system. For instance, a portal could be inside the lobby of an office tower, or inside a shopping mall or sports arena.

However there are technical barriers to the design and implementation of effective PRT systems or guideways for the PRT systems. Generally, the PRT systems require advanced control and communication systems and methods, and the ability to manage a large network of independently traveling vehicles using complex computing and communications software and hardware.

One of the technical aspects that continue to pose a significant barrier to implement PRT systems may be the use of wheels as the primary method of suspending vehicles. Although wheels are a familiar and common technology, their associated bearing surfaces and the mechanical devices required to make wheels navigate a track network add significantly to the complexity and potential failure points of a PRT system. In addition, the unavoidable wear accompanying wheels rolling on tracks becomes a significant maintenance problem when a typical system might utilize thousands, or tens of thousands of vehicles. Further, the use of wheels imposes a speed limitation on the vehicles.

In some respects, a PRT system implemented with wheels may be suited to serve a small local region or a relatively small closed path. In networks where the pathways have a relatively tight radii, the maximum speeds are limited by the maximum lateral accelerations permitted for the wheels. Such systems may work well in their limited capacities and can serve to demonstrate the viability of the basic PRT concept. But any effort to build a larger network or to link smaller networks together across realistic travel distances will face the wheel related problems. In this regard, keeping a wheeled system cheap and reliable generally means keeping the maximum speeds relatively low. And keeping the maximum speeds low means the transit times for the greater distances will be unacceptably long for most patrons. In other words, expanding a local circulator or linking two local circulator PRT systems is not practical with vehicle using small wheels. However, building a larger wheel-based PRT system may be prohibitively expensive. Current PRT systems lack an economical, reliable and lightweight means to carry vehicles in slower speed, tight systems and faster, longer distance systems. Specifically, the installation cost and intrusiveness of a guideway are the most critically limiting factors for a comprehensive PRT system installation, so great emphasis has been placed on reduction of both of these factors. A major part of the cost of a transit system is maintenance. What is needed is to keep the operation simple in order to minimize failure points in the PRT system.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The networked guideway transit system uses materials and methods of constructing guideway elements. The materials and methods are designed to reduce the static weight, cost and physical size of the guideway structure. Installation cost is also significantly reduced by the modular nature of the guideway components, which can be manufactured in a controlled factory environment using mass production methods. As a result, the supporting structure of the guideway can be quickly erected and the modular blocks inserted with simple equipment. In addition, complex alignment procedures are not required.

In accordance with some embodiments, an electrodynamic repulsion apparatus used in the networked guideway transit system that utilizes permanent magnet levitation and electrodynamic repulsion is provided. The electrodynamic repulsion apparatus provides passive centering forces for a vehicle bogie that is moving. The electrodynamic repulsion apparatus comprises a pair of coil arrays, each of which includes a plurality of groups of coil components. Each pair of coil arrays includes three electrical phases of the coil components wherein the coil components within each electrical phase are linked together in series. In this manner, the number of turns in each coil can be reduced, thus reducing manufacturing cost. The pair of coil arrays is configured to be individually switched on and off regardless of the operation of adjacent electrodynamic repulsion components, thus enhancing electrical operating efficiency.

In accordance with some embodiments, a guideway structure of a networked guideway transit system comprising a guideway structure beam and a plurality of modular guideway blocks loaded into the guideway structure beam is provided. The modular guideway block further comprises a drive circuit component for controlling drive current and for generating a drive signal, an electrodynamic repulsion component for maintaining an alignment of bogie lifting magnets, a first magnet component for providing lifting forces and a second magnet component for providing propulsion forces.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 7A-7F are cross-sectional views of different embodiments of the bogie segment and the modular guideway block used in the networked guideway system;

DETAILED DESCRIPTION

Figure 1A:
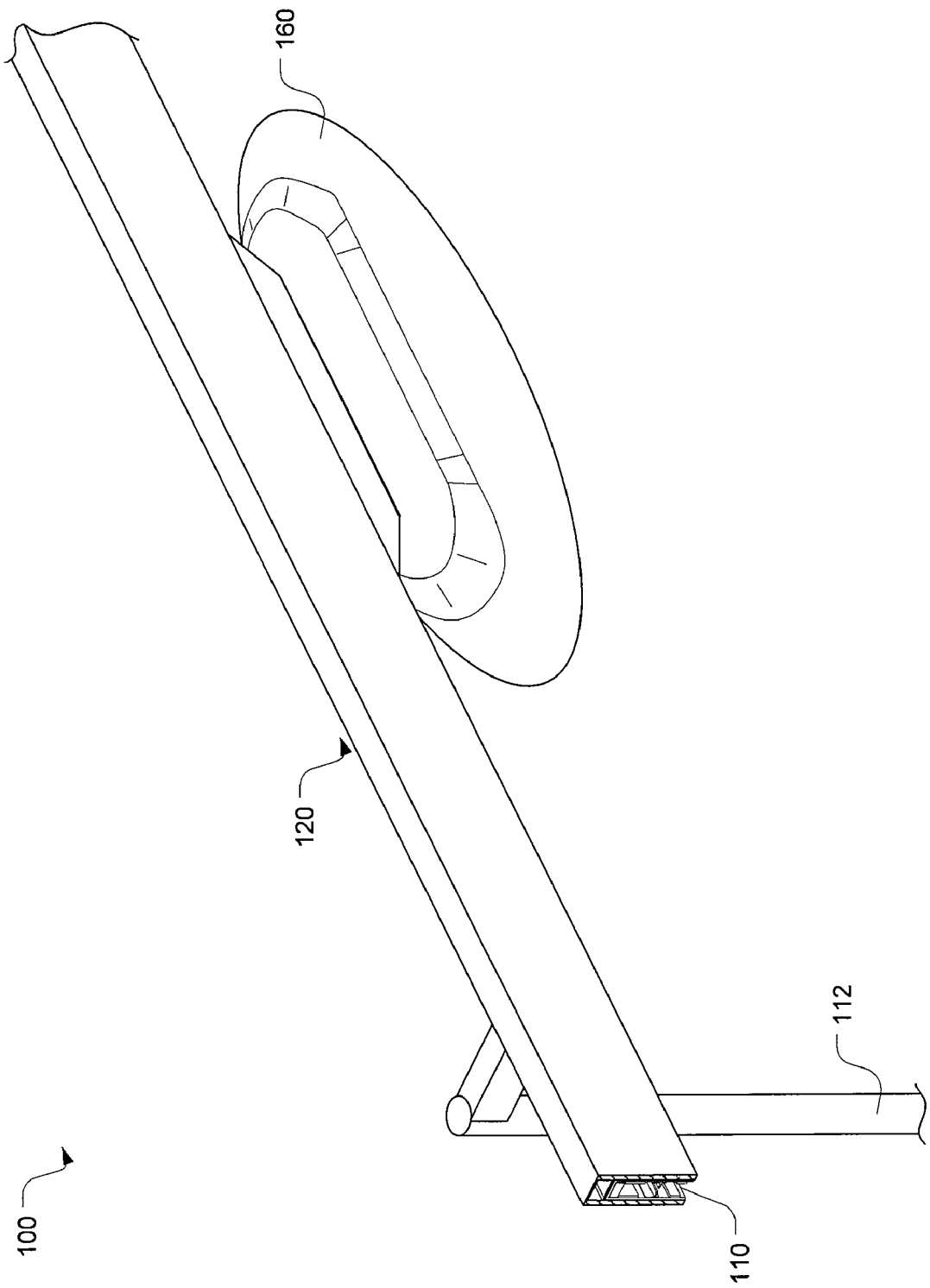
FIG. 1A is a perspective view of a networked guideway system in accordance with an embodiment of the present invention.

A method and system to integrate magnetic levitation technologies within a networked guideway transit system is provided. A method and system is also provided for modeling the networked guideway transit system as a form of packet switched data transfer network using a globally unique identifier. The magnetic levitation is used to replace wheels as the primary means of vehicle suspension and thus the automated transit systems (e.g., PRT system) can be made commercially and economically feasible. More specifically, a method and system use permanent magnet repulsion with induction-based repulsion within the networked guideway transport system, which can levitate passively with motion.

Generally described, the networked guideway transit system combines permanent magnet levitation with electrodynamic stabilization and linear motor propulsion. That is, the networked guideway transit system uses the permanent magnets to provide primary lift and uses electrodynamic repulsion to create centering forces at most operational speeds while integrating linear motor functions with the electrodynamic centering function. Further, the networked guideway transit system uses no moving parts in the guideways, which enhances reliability in the guideways.

In some embodiments, the vehicles are suspended from a guideway that is formed from modular elements (hereinafter, modular guideway blocks) inserted into a channel or beam, with the modular guideway blocks being electrically coupled to the beam and to each other to provide power and communications functions. Each of the modular guideway blocks includes a combination of current carrying coils and fixed magnets in appropriate configurations and operable to provide the functions of vehicle suspension or levitation, vehicle centering and stability, and vehicle propulsion and braking. The modular guideway blocks also provide connections to transit system power and communications buses which are typically contained in the channel or beam.

In some embodiments, the modular guideway blocks includes special coil shapes that do not require interleaving (and methods of manufacturing the same). That is, the shapes and configurations of the coils facilitate the easy insertion of modular guideway blocks without the need for interleaving coils in adjacent elements and without creating dead spots in the magnetic fields between elements. This provides an efficient and practical propulsion source for the vehicles, while obtaining the benefits of modular construction and design.

The features and elements of each modular guideway block are designed to facilitate construction of the guideway while maintaining the desired operating characteristics of comfort, reliability, and safety. The elements of each modular guideway block are relatively easy to install and remove without requiring the dismantling of large guideway sections.

Magnetic Levitation

Magnetic levitation (hereinafter, "Maglev") may provide advantages compared to traditional wheels on tracks. Generally, Maglev has low or zero mechanical friction and thus parts in a Maglev system do not wear from contact. It has a wide range of speeds over which it can operate and in operation it generates relatively low noise levels. Conventionally, Maglev as applied to traditional large train system architecture provides only marginally improved service characteristics, i.e. primarily shorter transit times on long runs where extreme ground speeds are attainable and practical. Because aerodynamic losses prevail at high speeds and powerful propulsion systems are required to overcome these losses, the extreme ground speeds achievable with Maglev are only feasible with large trains and large footprint guideways, and are obtained at an enormous energy cost. And with existing complex Maglev systems that require sensors, positional feedback, active control, or even active levitation power, this marginal benefit comes at much higher cost in basic infrastructure, and at increased risk for technical or operational problems.

In general, the combination of functional capabilities of Maglev technology and PRT systems may have been considered counterintuitive. The counterintuitive nature of this relationship is due to the failure of recognizing the performance potential of the respective technologies. In contrast, in forgoing described and supplied embodiments of the present invention, using a proper form of Maglev technology to replace wheels as the primary means of vehicle suspension makes a networked guideway transit system both feasible and commercially achievable as a method of moving vehicles. In addition, linear motor propulsion used with the Maglev suspension allows the great majority of the guideway to have no contact and little mechanical friction. This means less wear and less dust is generated compared to conventional Maglev systems, both of which factors contribute to lowering maintenance and improving reliability.

Guideway Transit System

As will be discussed in greater detail below, a networked guideway transit system 100 includes levitation, centering and propulsion components, utilizing permanent magnets to provide primary levitation and electrodynamic repulsion to create centering forces.

Figure 1B:
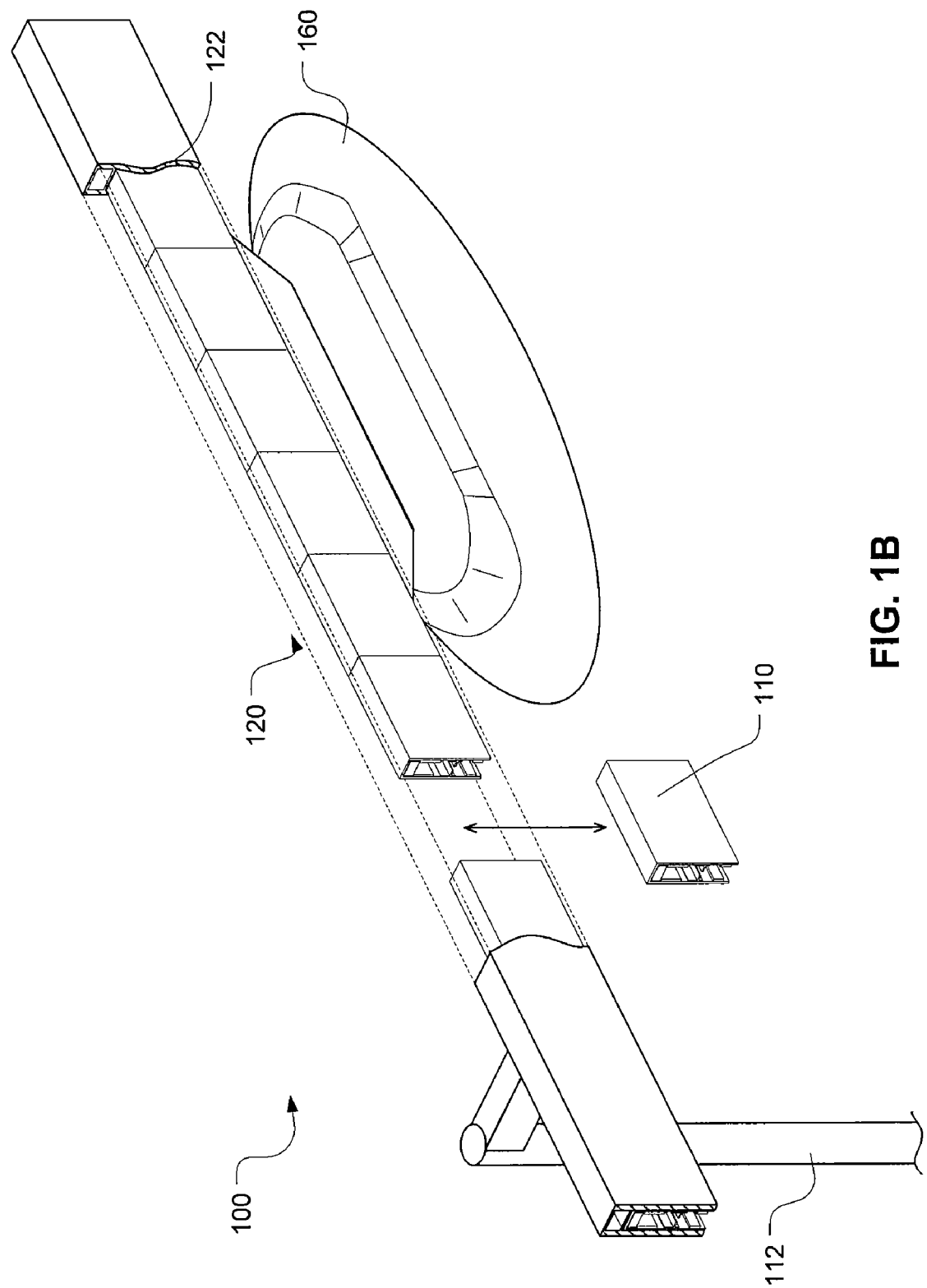
FIG. 1B is a perspective view of the networked guideway system showing an exposed view of modular guideway blocks of the guideway in accordance with an embodiment of the present invention.

With reference to FIGS. 1A and 1B, perspective views of a networked guideway transport system 100 are depicted in accordance with some embodiment of the present invention. The networked guideway transit system 100 generally includes a guideway 120 and a mating vehicle 160. The guideway 120 has a suitable geometry to support and guide the vehicle 160 at any speed reasonably associated with such a networked guideway transit system. The guideway 120 may include several modular guideway blocks that are straight and short segments of the guideway. As used herein, the modular guideway block refers to a basic unit of the guideway. As depicted in FIG. 1B, the modular guideway blocks may be loaded into a shell that forms the guideway structural beam 122 to carry the load between support columns 115. In some embodiments, the structural beam or channel 122 contains an opening into which may be inserted one or more modular guideway blocks 110. Note that although beam or channel 122 is depicted as a straight section in the figure, it may also be a curved section of a guideway in which one or more modular guideway blocks 110 are inserted.

Figure 2A:
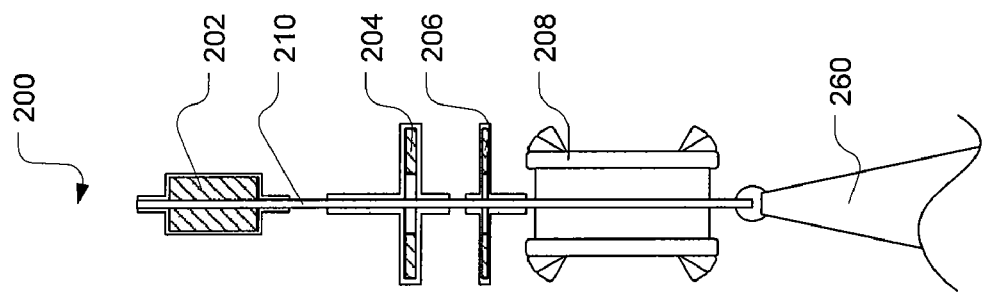
FIGS. 2A and 2B are cross-sectional views of an exemplary embodiment of a bogie segment used in the networked guideway system.
Figure 2B:
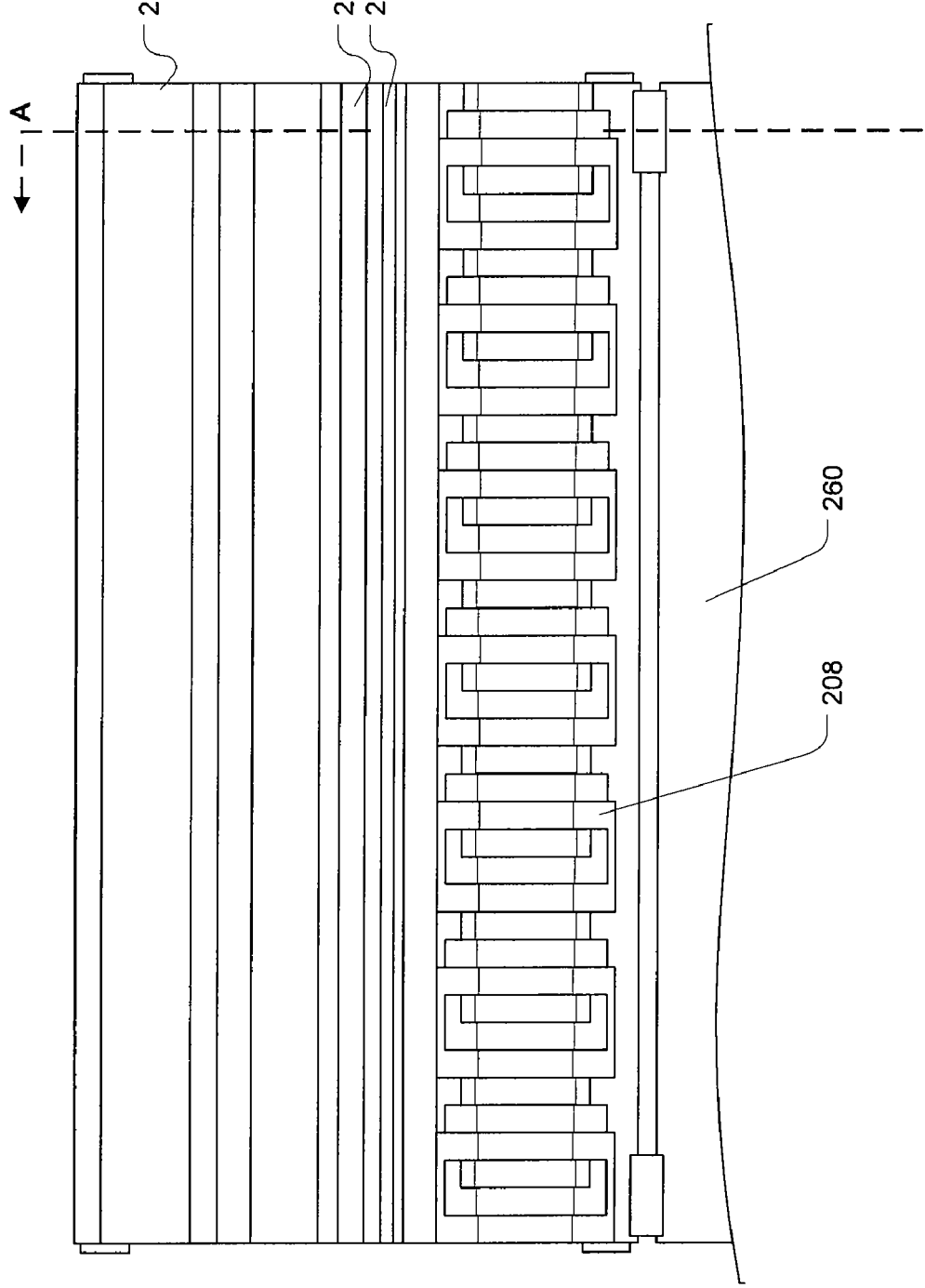

In the networked guideway transit system 100, the vehicle 160 is supported by a vehicle bogie (not shown) that interlocks with the guideway 120. As will be discussed in detail below, the vehicle bogie is a guideway element that couples a vehicle to the guideway. The vehicle bogie used for the networked guideway transit system may include several bogie segments, each of which includes levitation, centering and propulsion components. Each bogie segment may have a finite length in order to fit in a single modular guideway block 110. One non-limiting example of the bogie segment is shown in FIGS. 2A and 2B. It is noted that the figures described herein are not meant to show the exact or relative sizes, or the locations of the various components, but rather to illustrate the general configuration for the purposes of the discussion.

FIGS. 2A and 2B illustrate cross sectional views of the bogie segment 200 in accordance with an embodiment of the present invention. The bogie segment 200 includes primary permanent magnet repulsion (PMR) arrays, such as a bogie lifting magnet unit 204, that provide upward forces on the vehicle bogie. The bogie segment 200 further includes clamping magnets, for example a bogie clamping magnet unit 206, that provide downward or vertical clamping forces on the bogie.

The clamping magnets of the bogie segment 200 are additional static magnetic field sources, generally high field permanent magnets with poles aligned so as to be in repulsion to magnets on the guideway. It is noted that the clamping magnets are static magnets and can be located on the guideway or the vehicle bogie. In the illustrated embodiment, the bogie clamping magnet unit 206 is located on the vehicle bogie and makes use of the bottom sides of the guideway magnets to produce repulsion. In this embodiment, the bogie clamping magnet unit 206 may be used to add a downforce to the overall vertical force on the bogie segment 200. It is further noted that the bogie clamping magnet unit 206 may be sized and positioned as appropriate such that the bogie clamping magnet unit 206 does not significantly decrease the levitation height provided by the bogie lifting magnet unit 204, but in the event the vehicle bogie rides too high because of load perturbations, the bogie clamping magnet unit 206 forces the bogie back down more rapidly than gravity alone. This may stiffen the suspension and assist to maintain the vertical position of the vehicle bogie. Also, in the case where an end of the vehicle bogie protrudes into a section of the guideway that does not contain PMR components for lifting, the bogie clamping magnet unit 206 may prevent the protruding end of the vehicle bogie tipping down into that unsupported section by holding down the opposite end.

In addition, the bogie segment 200 can include a passive centering device (e.g. a device including the electrodynamic repulsion (EDR) centering components 208) that comprises moving coils or conductor stacks. The EDR centering components 208 may primarily provide centering forces but may also provide some propulsion forces to the bogie segment 200. The bogie segment 110 may contain more PMR components (linear magnetic arrays) for mating, such as a bogie propulsion magnet unit 202, each arranged to be in opposition to corresponding PMR components (linear magnetic arrays) in the guideway.

In one embodiment, the EDR centering components 208 may also function as propulsion components. As will be discussed in greater detail below, the coils in the conductor arrays (not shown) of the EDR centering components 208 are energized to provide forward thrust or regenerative braking by interaction with the magnets arranged in the guideway. The electrical power may be delivered to the moving coil, the stationary coil or a combination thereof. In some embodiments, both stationary and moving coils are included in the vehicle bogie. In such embodiments, the stationary coils can deliver primary electrical power to the vehicle bogie, which is converted to the kinetic energy of motion, while the moving coils deliver secondary electrical power to the onboard energy supply by tapping into the same kinetic energy. In this manner, the electrical power can be transmitted from the guideway to the vehicle bogie (eventually to the vehicle) without contact. The stationary coils may be combined into a modular guideway block. It is noted that the bogie segment described in conjunction with the aforementioned embodiments may include other components well known in the transportation art but not shown for ease of illustration, such as centering rollers, skids, electric motors that provide a drive source to the vehicle, etc.

Figure 3A:
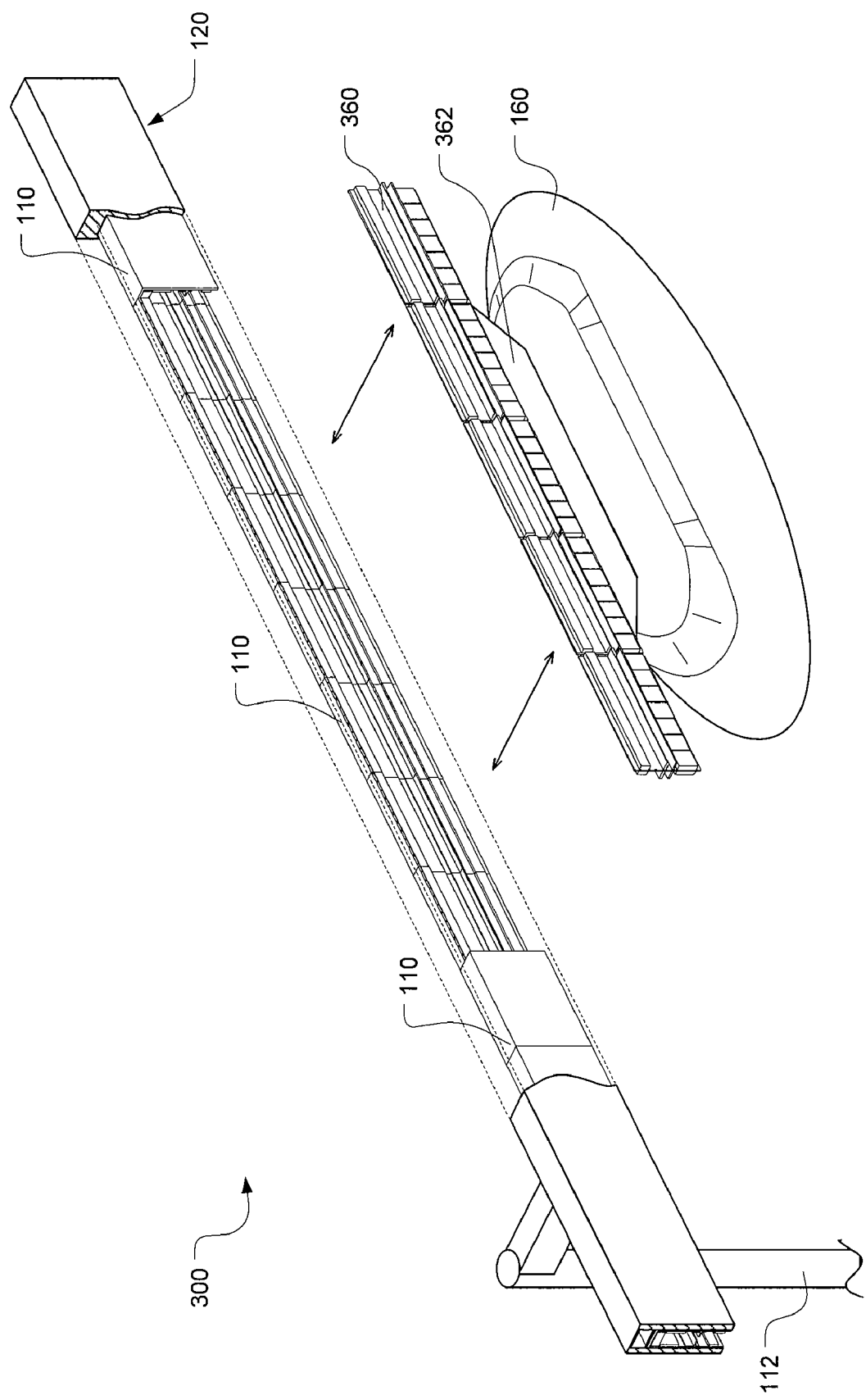
FIGS. 3A and 3B are perspective views of the networked guideway system of FIG. 1A showing an exposed view of bogie segments of the vehicle bogie in accordance with an embodiment of the present invention.
Figure 3B:
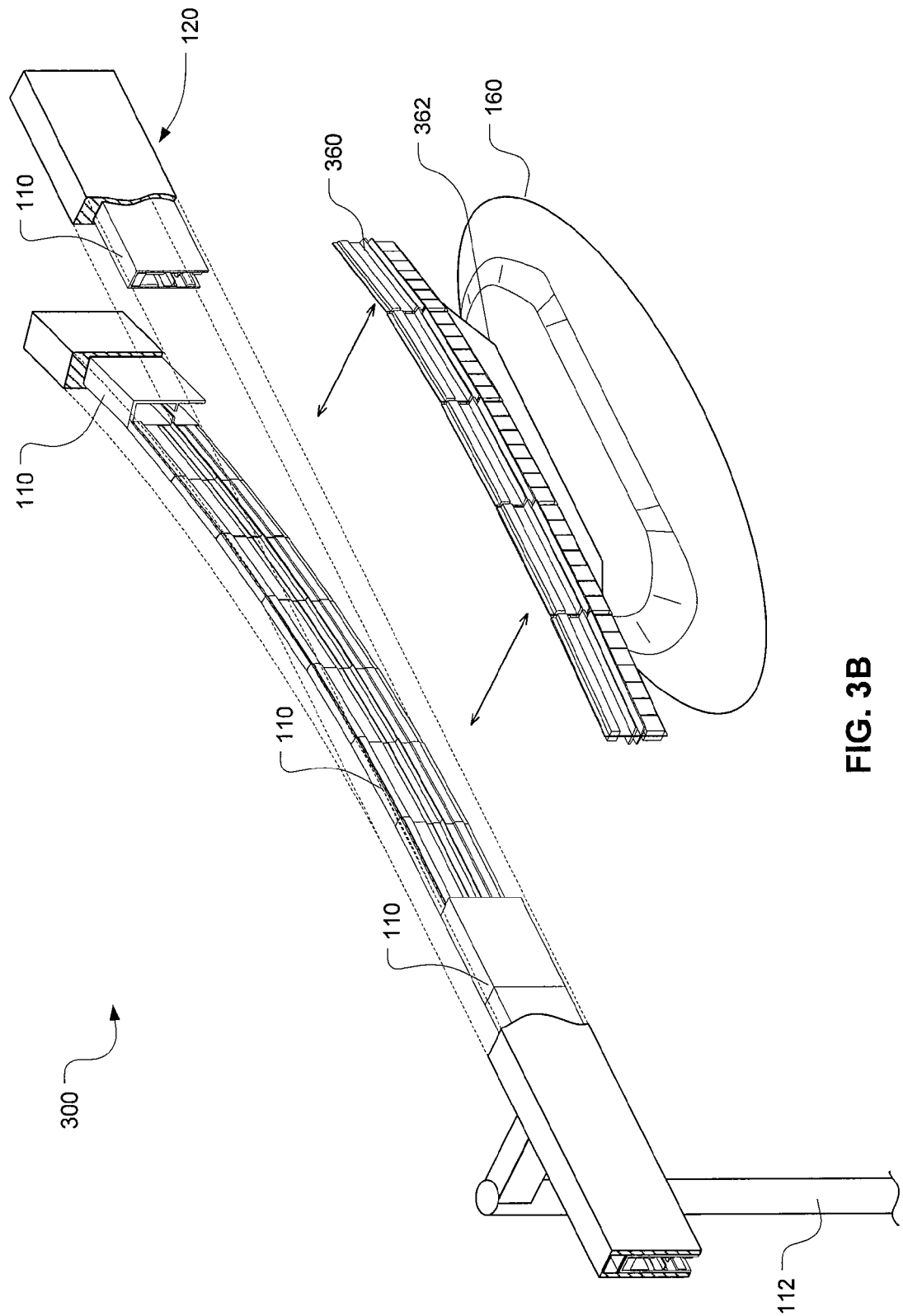

FIG. 3A depicts a perspective view 300 of the networked guideway transit system showing an exposed view of bogie segments. As shown, one vehicle bogie 160 may include a set of five bogie segments. In a preferred embodiment, the networked guideway transit system uses underhanging vehicles 160 to facilitate high-speed operation. The vehicle bogie 360 is mounted on vehicle attachment fin 362 that attaches the underhanging vehicle 160 to the vehicle bogie. The vehicle bogie 360 is used for supporting the underhanging vehicle 160 and for mating the underhanging vehicle 160 to the guideway 120. As described above, the lifting is generated by magnetic repulsion between permanent magnets of the PMR components in the guideway modular block 110 and the vehicle bogie 360. As depicted, the guideway 120 and/or the guideway module block 110 may have a shape that is closed at the top and sides and open at the bottom (an "open bottom enclosure"). Such a shape may facilitate operation of components with permanent magnets due to a reduction of foreign material. For example, the shape may cause intrusion of foreign material, such as snow and/or mechanical debris, to be less likely. FIG. 3B depicts another perspective view 300 of the networked guideway transit system showing an exposed view of articulated bogie segments. Each bogie segment has a size such that the bogie segment can be nested in a modular guideway block 110. In order to navigate some portions of the guideway with tight radii, including diversion points of the guideway, the bogie segments of the vehicle bogie 360 may be articulated to flex in a horizontal dimension. That is, the bogie segments of the vehicle bogie 360 may be hinged along its vertical front and rear edges. This arrangement may leave the vehicle bogie rigid in the pitch, or vertical dimension. Moreover, in this way, the full mass of the vehicle 160 is distributed along the full length of the bogie segment. In addition, the bogie segments of the vehicle bogie 360 may be able to traverse sections of the guideway where there is not full magnetic levitation available.

In addition, it is possible to reduce the bogie size (the cross section of the bogie) by combining the motor propulsion and EDR centering functions. The small cross section of the bogie reduces its aerodynamic resistance. Thus, its mass can be minimized. The largest lateral dimension may be kept small, which facilitates good track switch design. It should be noted that the roll stability of the bogie is not dependent on the lateral spread between the primary lifting PMR components, but rather is achieved by the vertical spread between the EDR centering components.

In one embodiment, several modular guideway blocks may be loaded into a shell that forms the guideway structure beam to carry the load. The weight of the guideway beam is mostly static mass, not vehicle mass. Further, by using materials and methods designed to minimize the static weight, cost and physical size of the guideway beam, the supporting structure of the guideway (guideway beam) can be easily erected and the modular guideway blocks can be inserted with simple equipment. Further, the installation cost is minimized by the modular nature of the guideway components, which can be manufactured in a controlled factory environment using mass production methods.

Figure 4B:
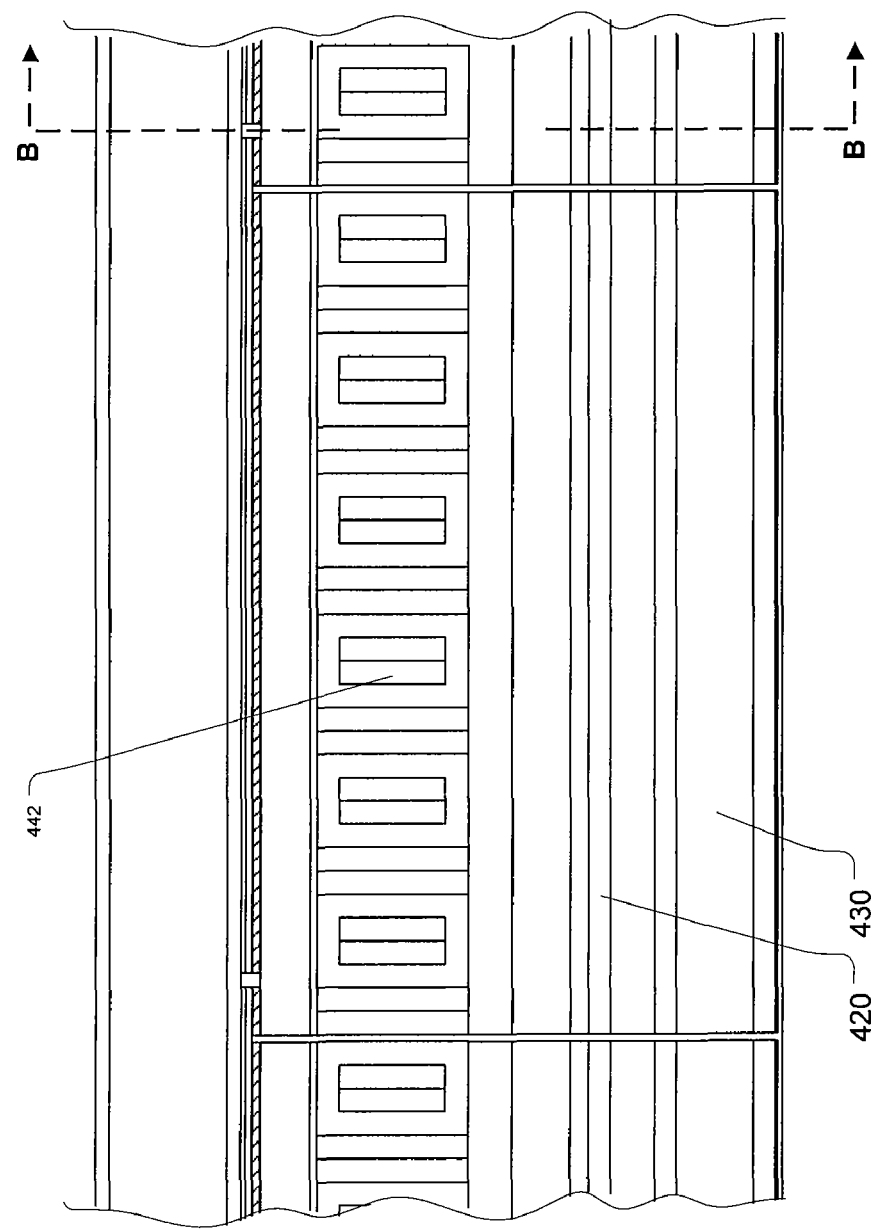
FIGS. 4A and 4B are cross-sectional views of an exemplary embodiment of the modular guideway block used in the networked guideway system.
Figure 4A:
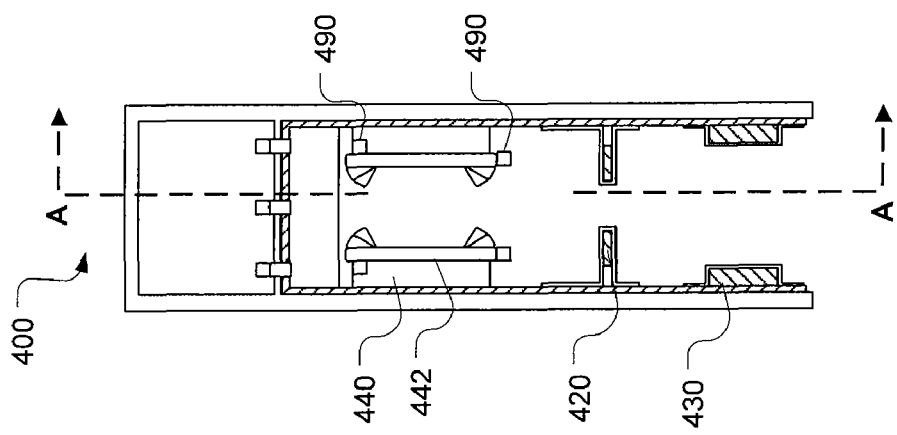
Figure 5:
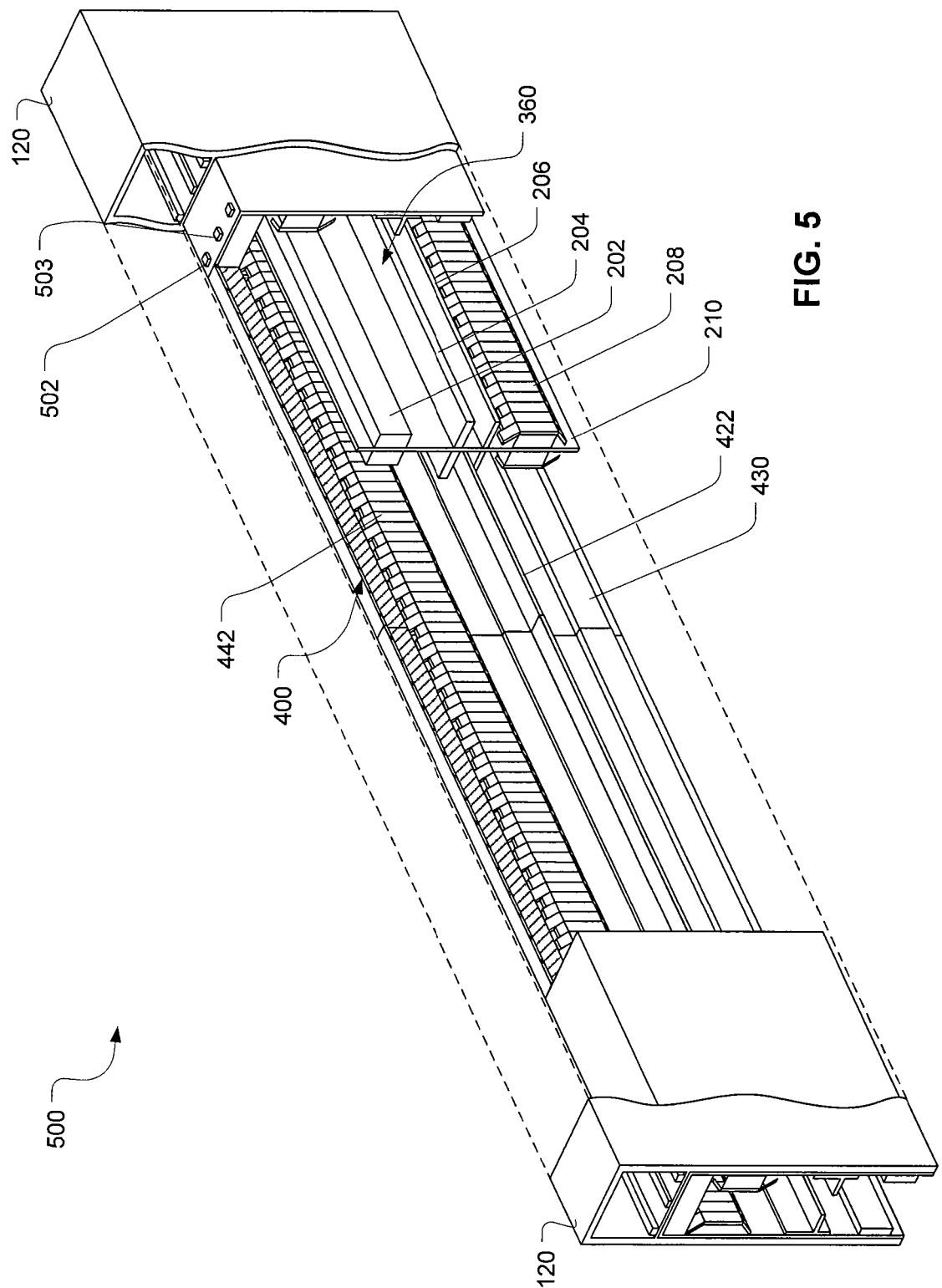
FIG. 5 depicts a cross sectional view of an exemplary embodiment of a portion of guideway showing a bogie segment nested in a modular block guideway.

The modular guideway block of the networked guideway transit system will now be described in more detail. In FIGS. 4A and 4B, cross sectional views of the modular guideway block are depicted in accordance with an embodiment of the present invention. FIG. 5 depicts a cut away view 500 of a portion of guideway showing a bogie segment 360 nested in a modular guideway block 400 in accordance with an embodiment of the present invention.

The modular guideway block 400 also comprises several PMR components that may be linear arrays of high field permanent magnets. Generally, there are two or more linear static magnetic arrays in the modular guideway block 400 as the PMR components. In one embodiment, the modular guideway block 400 includes a first PMR component, for example a guideway lifting magnet unit 420, that provides primary lifting and vertical clamping forces. As will be appreciated, the primary lift forces are produced by static magnets in the first PMR component arranged in homopolar linear arrays, the long axis of the arrays aligned in the travel direction of the moving vehicle. The modular guideway block 400 further includes a second EDR component, for example a guideway propulsion magnet unit 430, that provides primary centering forces and auxiliary propulsion forces. Permanent magnets used in the guideway lifting magnet unit 420 and the guideway propulsion magnet unit 430 may vary in size depending on track locations. As shown in FIG. 5, the modular guideway block 400 may include some elements, for example a module power connector 502, a module data connector 503, that provide an electrical connection, coupling or other form of signal or data transfer between a power bus or other form of transmission line contained in beam or channel 122 (FIGS. 1A, 1B) and each modular guideway block.

The modular guideway block 400 further comprises EDR centering components, such as guideway propulsion coils 442, that passively centers a moving vehicle bogie. That is, the EDR centering components of the modular guideway block 400 and the EDR magnets of the bogie segment 200 constitute a EDR centering subsystem that controls and centers the moving bogie via the interaction between the EDR magnets and electrically conductive elements in the networked guideway transit system. There are various ways to implement the EDR centering components. For example, when the vehicle bogie is at standstill or moving at low speeds (e.g., below a few meters per second), the EDR centering components in the modular guideway blocks are not effective. In this case, centering rollers or skids (not shown) keep the vehicle bogie laterally centered. It is noted that the locations of the EDR magnets and the EDR centering components of the EDR centering subsystem may be exchanged so that various embodiments can include any suitable arrangements of the permanent magnets and coils. One non-limiting example of implementing the EDR centering subsystem is depicted later in FIG. 6.

As shown, in some embodiments, beam or channel 122 may contain a channel or opening containing a power transmission and distribution bus 502, a communications bus 503 and one or more elements to permit modular guideway blocks 110 to electrically connect to the buses and if, necessary, to be structurally connected to beam or channel 122. The electrical connections between modular guideway blocks 110 and the communication bus permit each modular guideway block to communicate and exchange data with a control, communications or administrative entity or function, and in some embodiments with a transit vehicle or vehicles and/or other of the modular guideway blocks 110.

As discussed above, the PMR components and the EDR centering components included in the bogie segments and/or the guideway modular blocks perform well as a means of conveyance in the networked guideway transport system 100. That is, the levitation (lift force) produced by the PMR components has good lift to magnet mass ratio, a significantly low drag at all speeds and can ride over small gaps between adjacent sections. As such, the PMR components used in the bogie segments and the modular guideway blocks can be compact, much smaller than wheels of the same carrying capacity and suspension stiffness. The PMR components have no rotational inertia and lower mass than a comparable wheel system.

To control possible lateral instability in the PMR components and to maintain the alignment of the lifting magnets (PMR components), one or more EDR centering subsystems are used in the described embodiments. The EDR centering subsystem comprises electrically conductive elements, for example the guideway propulsion coils 442, that are in relative motion to the magnetic sources (e.g., propulsion magnet units). As the magnetic flux varies within the conductors, electrical currents are induced to flow. The interaction of those currents with the magnetic fields produces forces with drag and repulsion components. As discussed above, the EDR centering subsystem has the advantage of producing nearly constant force over a large range of transverse displacement. Thus, the EDR centering subsystem works well when displaced in a direction normal to the travel direction and the force direction. Also, the force increases as the separation between the magnets and conductors decreases, making the arrangement stable in that axis.

In one embodiment, the networked guideway transit system may utilize a dual EDR arrangement that includes two magnetic arrays facing a set of conductors, or conversely a set of linked conductor arrays bracketing a magnetic array. The restoring force may increase as the center element moves farther off the center plane in the dual EDR arrangements. These attributes make EDR centering subsystems complementary to the characteristics of the PMR components lifting arrangement in the networked guideway transit system.

As will be appreciated, there are a number of ways to implement EDR subsystems in conjunction with the networked guideway transit system. One non-limiting exemplary way of implementing the EDR subsystem is depicted in FIG. 6.

Figure 6:
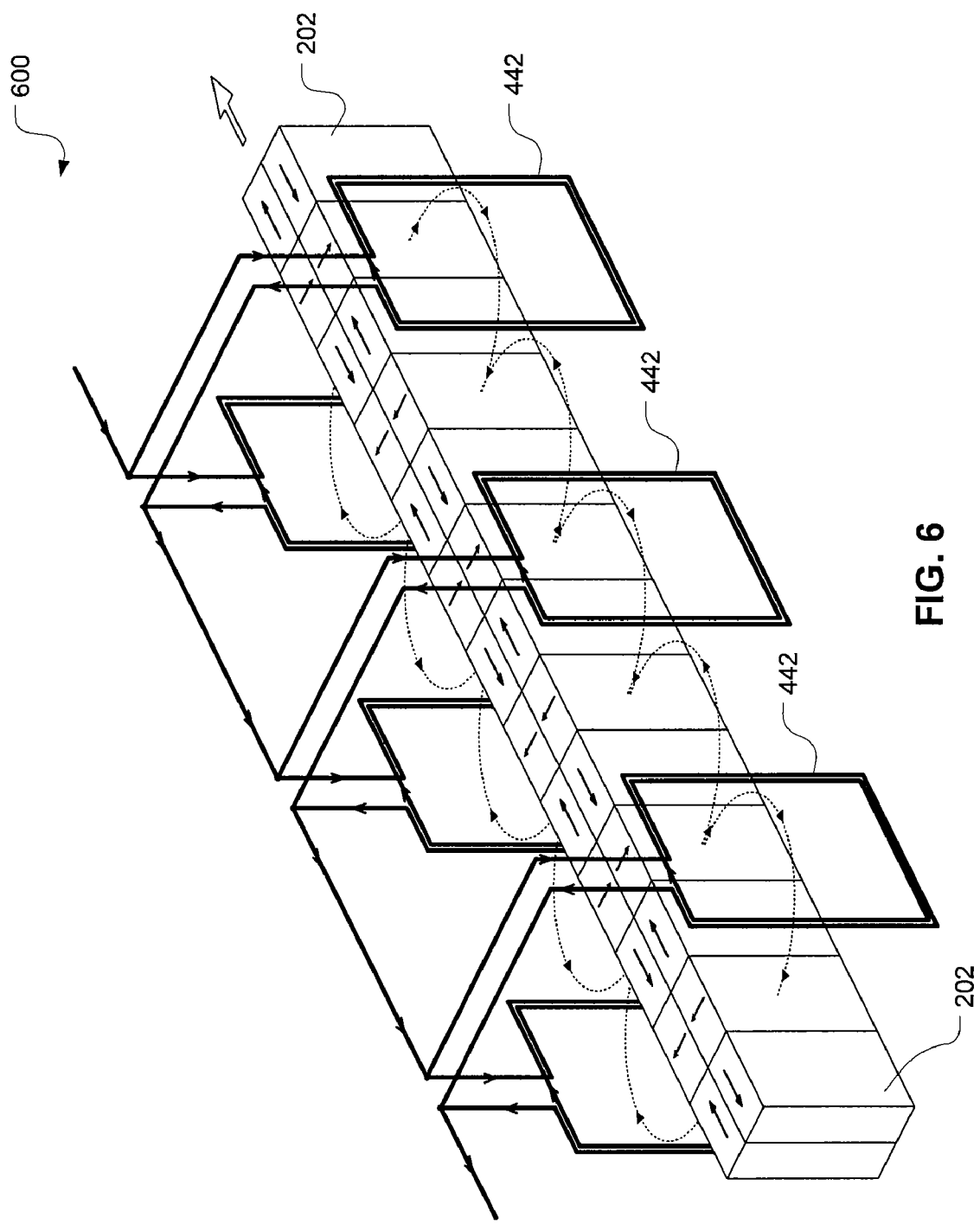
FIG. 6 depicts an exemplary way of implementing the electrodynamic repulsion (EDR) centering subsystem in the networked guideway system.

As shown in FIG. 6, the permanent magnet arrays (EDR magnets) in the bogie segment are located at the center with coils that are used as passive centering device. The coils, such as guideway propulsion coils 442, are connected in laterally opposite pairs in such a way that the motion induced voltages cancel when the magnet arrays are laterally equidistant from the coils. In this embodiment, if the permanent magnet arrays are closer to one side than the other, current flows within each coil pair and the forces tends to push the magnets back to a center position. Both arrangements are present in embodiments discussed in conjunction with FIGS. 2A, 2B, 4A and 4B above. In the embodiments, electrical energy can be transmitted from the guideway to the bogie-vehicle or vice versa.

The degree of roll stability required on any particular section of the guideway is determined by several factors, including the curvature of the guideway, the speed of travel, the mass of the vehicle, and the position of the vehicle, among others. Some of such factors can be controlled for a particular period or position of the guideway magnetic fields. For example, in a turn where the bogie-vehicle mass pushes against the outer wall of the guideway larger fixed magnets could be installed, while on the inner wall smaller magnets could be used. In this way, the centering force could be biased to anticipate and compensate for required centripetal turning force. It is also possible to drive the EDR coils, for example the propulsion coils 208, 442 (FIGS. 2A, 4A), in such a way as to produce an active lateral force. This arrangement can be used in high-speed turns to reduce the magnetic drag incurred by the large passively induced currents that would otherwise be present. Generally, the energy required to actively drive the EDR coils to produce lateral force is on the order of one fourth that required for producing the same force by passive induction.

In an alternative embodiment, the networked guideway transit system may include a series connection of multiple coils to increase inductance of the EDR centering subsystems, which tends to reduce overall centering force but also reduce magnetic drag and the velocity at which the drag force transitions to centering force. This may be used for a lower speed section of the guideway. Likewise, the series or parallel connection of multiple coil pairs to the electrical drive or sinking circuits affects the magnitude of the induced voltage and can be optimized for the expected operational speed and power source characteristics.

Referring now to FIGS. 7A-7C, cross sectional views of exemplary embodiments of a portion of guideway including a modular guideway block and a bogie segment are depicted. As shown in FIG. 7A, an exemplary embodiment 710 includes the EDR components that are shown as inwardly pointed permanent magnet arrays 430 in the guideway, outwardly focused permanent magnet arrays 202 on the bogie, and propulsion coils 442, 208. Motion in the travel direction induces voltages within the guideway propulsion coils 442 in the guideway and coils 208 on the vehicle bogie. In both cases, the coils are connected in laterally opposite pairs such that the motion-induced voltages within the coils tend to oppose when the vehicle bogie is on the center plane. This results in no current flow within the coils.

When the vehicle bogie is biased toward one side of the guideway the voltages increase in the coils on that side and decrease in the coils on the opposite side. This results in a forward current in the coils on the close side and a back current in the coils on the far side. The close side experiences repulsion while the far side experiences attraction. This tends to bring the bogie back toward the center plane. The lack of currents when the bogie is at the center plane results in very low magnetic drag at that position. Because there are laterally constraining forces high and low, the bogie is resistant to rolling. The underhanging vehicle 160 (FIG. 3A) can be damped in its swinging motion with the resulting reaction forces taken up by the bogie and transmitted to the guideway without mechanical contact. Both the upper and lower centering elements in this configuration can contribute to propulsion.

As shown in FIG. 7B, an exemplary embodiment 720 includes the PMR components and the upper lateral centering elements similar to the exemplary embodiment 710 described above and a modified EDR subsystem. As with the exemplary embodiment 710, the upper lateral centering elements may function as the primary motor in the exemplary embodiment 720. The exemplary embodiment 720 may include lower centering elements having an EDR arrangement that uses a stack of planar conductive elements 290 or a so-called ladder track instead of coils. The stack of planar conductive elements 290 is a passive electrical conductor array. The PMR components, such as guideway propulsion magnet unit 430, of the guideway are focused inward onto this conductor array. As the vehicle bogie moves, voltages are induced within the conductors. Because the guideway magnets, such as the guideway propulsion magnet unit 430, are arranged so that their lateral fluxes are oppositely directed there is a steep gradient in the lateral flux density with lateral position, with lateral flux density tending to zero at the center plane. The induced voltages are strongly dependent on the lateral flux components so at center plane minimum voltages occur.

As in the previous embodiment the voltages give rise to currents within the conductors and the interaction between these currents and components of the magnetic flux field tend to push the conductor stack (and thus the bogie) back toward the center plane. Because there are laterally constraining forces high and low the bogie is resistant to rolling and the underhanging vehicle 160 (FIG. 3A) can be damped in its swinging motion. The resulting reaction forces taken up by the bogie may be transmitted to the guideway without mechanical contact. The advantages that the exemplary embodiment 720 has are simpler construction of the conductor array compared to the motor coils, and more powerful centering force for the same magnetic array size. In fact, the exemplary embodiment 720 produces the strongest centering forces for a given size of centering element and it produces those strong centering forces near the pivot point where they are maximally effective at controlling lateral displacement of the vehicle.

As shown in FIG. 7C, an exemplary embodiment 730 includes several permanent magnet components and upper lateral centering elements in a similar manner to the exemplary embodiment 710. The lower centering elements in this embodiment 730 are also the same as the upper centering elements, including the guideway propulsion coils 442 and a permanent magnet component 202 for flux generation. This exemplary embodiment 730 has the advantage of additional propulsion power from motor coils with guideway-sourced power. Also, significantly, this embodiment 730 uses much less magnet mass in the guideway, which may lead to substantial cost reductions in construction.

Referring now to FIGS. 7D-7F, more exemplary embodiments are depicted. As shown, bogie segments of these embodiments do not include clamping magnets 206 (FIG. 2) for providing vertical clamping forces. Instead, the exemplary embodiments 740, 750, 760, include two EDR centering subsystems. The upper subsystem comprises a linear motor with bogie propulsion magnet arrays 202, a guideway located drive module 449 and guideway propulsion coils 442. Motion in the travel direction induces voltages within the guideway propulsion coils 442. The coils are connected in laterally opposite pairs such that the motion-induced voltages within the coils tend to oppose when the bogie is on the center plane. This results in no current flow within the coils. When the bogie is biased toward one side of the guideway the voltages increase in the coils on that side and decrease in the coils on the opposite side. This results in a forward current in the coils on the close side and a back current in the coils on the far side. The close side experiences repulsion while the far side experiences attraction. This tends to bring the bogie back toward the center plane. The lack of currents when the bogie is at the center plane results in very low magnetic drag at that position.

The lower EDR centering subsystem comprises a pair of EDR components, such as guideway based planar conductor stacks 290 as shown. The same magnets 202 that provide the flux for the motor and centering in the upper subsystem provide flux for the lower subsystem. In this case, the magnets are above the conductors but overlap by a small fraction of the conductor height. The transverse flux of the magnet arrays induces currents to flow within the guideway based planar conductor stacks 290. The magnitude of the currents varies with the flux density and with the degree of overlap between the magnets and the conductors. When the magnets are closer to one side the flux density, and thus the induced current, is greater. When the overlap is greater the induced current is also greater. The pattern of conductive pathways within the stacks is such that the induced currents flow through vertically oriented paths and are concentrated in the upper and lower edges of the stacks. The interaction of the longitudinal components of the magnetic fields and the electrical currents through the vertical conductors causes forces that tend to push the conductors away from the magnets. Since the magnitude of the force is dependent on the magnitude of the electrical currents, the closer the magnets are to the conductors the larger the repulsion force between them. The electrical currents are dependent on the proximity between the magnets and the conductors, and on the magnitude of the flux density at the conductor (which also increases with decreasing distance). Thus, this may produce a laterally stable arrangement.

The interaction of the transverse components of the magnetic fields and the concentrated currents in the upper edges of the conductor stacks create forces that tend to resist the vertical overlap of magnets and conductors, in effect pushing the magnets back up out of the space between the conductor stacks. In the described embodiments, the lift generated by the motion of the bogie reduces or eliminates the requirement for the direct magnetic repulsion from the homopolar permanent magnet arrays.

Coil Construction

Conventionally, using a short-length modular guideway block can be problematic in terms of guideway construction, especially in consideration of the motor coils and their required interface with the motor coils of adjacent modular guideway blocks. That is, a typical linear motor may require interleaving the windings with those of the next motor coil. Such interleaving may not be practical in the networked guideway transit system where modular guideway blocks are intended to be easily replaced or interchanged. In some embodiments, the modular guideway block includes motor coils having the shapes and configurations that facilitate the easy insertion of the modular guideway block without the need for interleaving coils in adjacent modular guideway blocks and without creating dead spots in the magnetic fields between modular guideway blocks. With reference to FIGS. 8A-8C and 9A-9C, the motor coil used in the modular guideway block is described in greater detail.

Figure 8B:
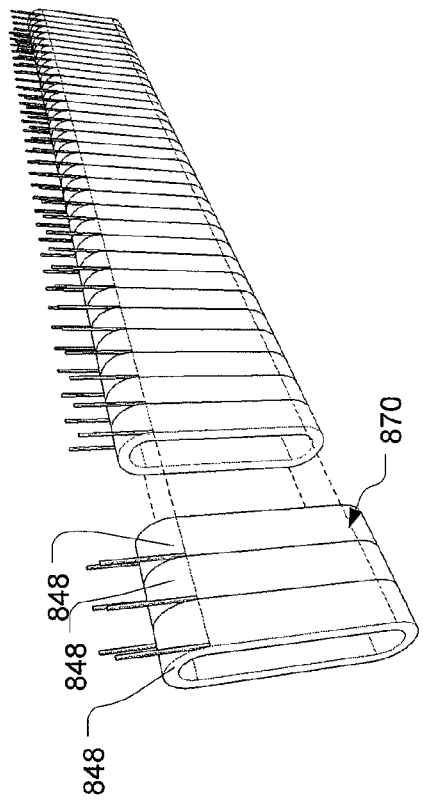
FIGS. 8A-8C depict schematic views of motor coils that are used in the modular guideway block in accordance with an embodiment of the present invention.
Figure 8C:
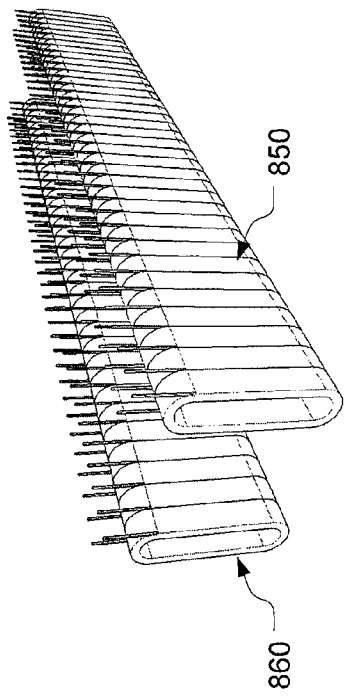
Figure 8A:
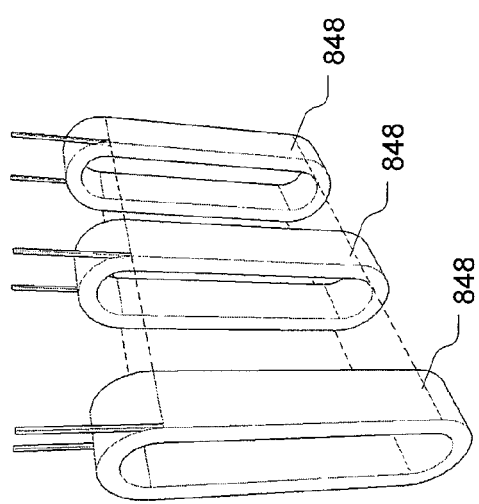

FIGS. 8A-8C depict schematic views of motor coils that are used in the modular guideway block in accordance with an embodiment of the present invention. In this embodiment, all the coils on either side of the modular guideway block are wound about axes that run approximately parallel to the travel direction along the guideway. As shown in FIG. 8A, the individual coils 848 are wound in racetrack shape and abutted along their axes. Each coil 848 has many turns, for example 100 turns, of insulated wire. The coils are arranged in three interleaved families spaced at regular spatial intervals along the travel direction. All coils within each family are driven with a common electrical signal. A family of coils thus driven constitutes one phase of an electric motor. The spatial interval along the travel direction between successive coils within one phase is approximately equivalent to the spatial interval between points of maximum flux density and opposite polarity along the permanent magnetic array 202 of the vehicle bogie. In this embodiment, successive coils within a phase are connected with opposite polarity so that electrical current flows in opposite directions within successive coils. Since both magnetic polarity and electrical polarity reverse between successive coils of a phase, force direction remains constant between the same coils and force direction remains constant over all the coils within a phase. The interleaving distance between the centers of coils in successive phases is one third of the distance between successive coils of a single phase. Generally, the dimension of the coils along the travel direction is such that the windings of the coils occupy a large fraction of the interleaving distance between coils. Thus, nearly the entire distance along the travel direction is filled with coils in a regularly repeating pattern of the three phases. This arrangement is identical along either side of the guideway and coils directly opposite each other across the guideway are always of the same motor phase. Furthermore, within a phase the coils directly opposite across the guideway are electrically linked pairs, which will be elaborated in detail below. In the embodiment, three individual coils are assembled to make a group 870 containing one coil from each of the three phases as depicted in FIG. 8B.

These groups 870 are further assembled into full coil arrays 850, 860, again along a common axis. In one embodiment, twelve groups may be used to make a full array in a modular guideway block, then two arrays 850, 860 go into each modular guideway block, one at either side. The coils 840 are laterally paired, with one coil from the array 850 paired with the coil in the other array 860 directly opposite. The ends of the conductor from each coil extend up into the electronics module 449 (FIGS. 7D-7F) and are connected to the conductors of the paired coil from the other side. The connection is such that the coils are electrically parallel, that is when a voltage is applied to the coil pair the full voltage appears on both coils. Then, the coil pairs within a phase are further linked together in series, that is the same electrical current will flow within every coil pair within a phase. A full phase has but two final connections terminating in the drive circuit within the electronics module 449. Application of sinusoidally varying electrical currents of the same frequency but staggered in time by one third of a cycle to each of the three phases of coils results in the propagation of an electromagnetic wave along the travel direction. In operation, the coils 840 interact with the magnetic flux mainly in the conductors toward the magnetic arrays, in this case in the coils inboard legs as seen in FIG. 8C. The outboard legs would be counter functional but for their location within lower magnetic flux density due to their increased distance from the magnets. The fraction of coil conductor that is magnetically engaged is on the order of 25% of the total conductor volume. The primary advantage of this coil type is the ease of fabrication and assembly into a coil array. By using an even number of coils per coil array per phase, and by magnetically engaging only one leg in each coil, the coil arrays are made to terminate bluntly and can be directly abutted to the coil arrays of the next modular block without the requirement of interleaving coil legs in successive blocks.

Figure 9A:
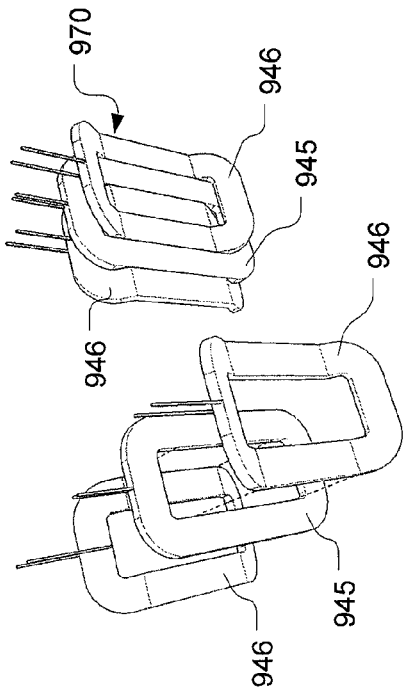
FIGS. 9A-9C depict schematic views of motor coils that are used in the modular guideway block in accordance with another embodiment of the present invention.
Figure 9B:
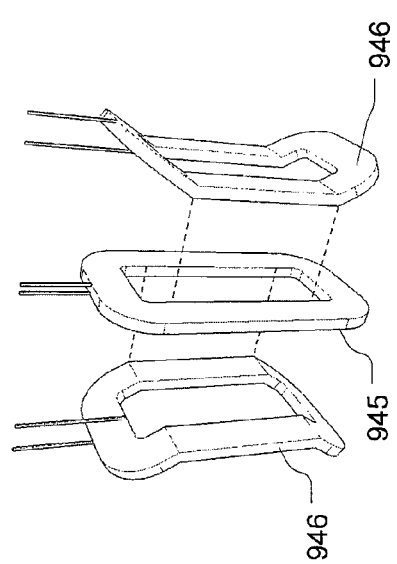
Figure 9C:
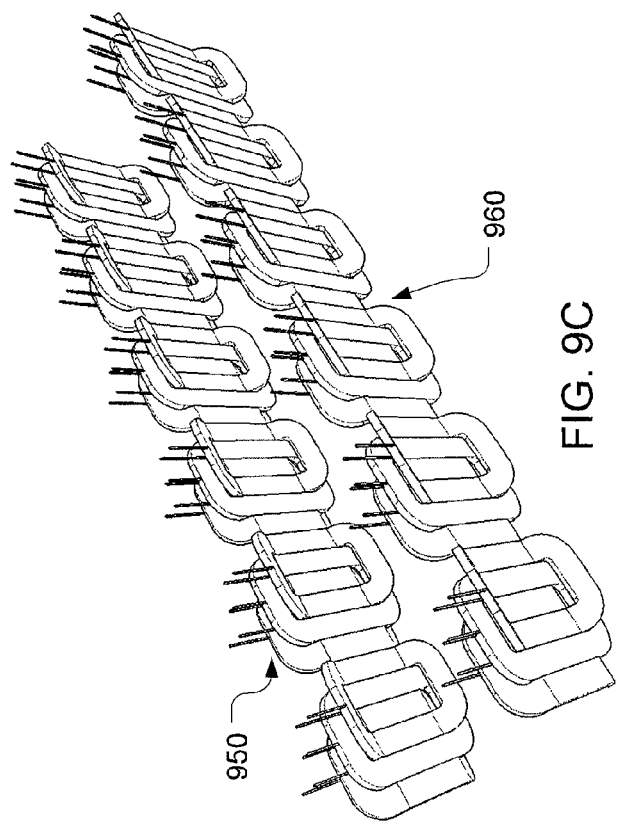

FIGS. 9A-9C depict schematic views of motor coils that are used in the modular guideway block in accordance with another embodiment of the present invention. In this embodiment, the axes of the motor coils are approximately perpendicular to the long axis of the guideway and the direction of vehicle motion. Coils are wound on a rectangular bobbin, approximately 100 turns. The conductor turns are immobilized. As shown in FIG. 9A, some coils 946 are bent at both ends while some coils 945 are flat. In one embodiment, two bent coils 946 and one flat coil 945 may be assembled to form a group 970 as depicted in FIG. 9C. In one embodiment, six groups are bonded to a common support (not shown) to form one full coil array 950, 960 as depicted in FIG. 9C. Two coil arrays 950, 960 go into a full modular block, one at either side. Each coil array comprises three interleaved families of coils spaced at regular spatial intervals along the travel direction. All coils within each family are driven with a common electrical signal. A family of coils thus driven constitutes one phase of an electric motor. The spatial interval along the travel direction between the centers of the legs of each coil is approximately equivalent to the spatial interval between points of maximum flux density and opposite polarity along the permanent magnetic array 202 of the vehicle bogie. Because the legs of each coil will carry electrical current in opposite directions and the legs of each coil will be engaged with magnetic flux with opposite polarity the net effect is that force direction is the same on both legs of a coil. Also, by using this same spatial interval for the distance between the centers of the leading and trailing legs of successive coils within a phase and by driving all coils within a phase with a the same signal the force direction remains constant over all the coils within a phase. The interleaving distance between the centers of coils in successive phases is one third of the aforementioned spatial interval. Generally the dimension of the coils along the travel direction is such that the windings of the coils occupy a large fraction of the interleaving distance between coils. Thus, nearly the entire distance along the travel direction is filled with coils in a regularly repeating pattern of the three phases. This arrangement is identical along either side of the guideway and coils directly opposite each other across the guideway are always of the same motor phase.

As shown, the coils are laterally paired, with one coil from each array 950, 960 paired with the coil in the other array directly opposite. The ends of the conductor from each coil extend up into the electronics module 449 (FIGS. 7D-7F) and are there connected to the conductors of the paired coil from the other side. The connection is such that the coils are electrically parallel, that is when a voltage is applied to the coil pair the full voltage appears on both coils. Then, the coil pairs within a phase are further linked together in series, that is the same electrical current will flow within every coil pair within a phase. A full phase has but two final connections terminating in the drive circuit within the electronics module 449. Application of sinusoidally varying electrical currents of the same frequency but staggered in time by one third of a cycle to each of the three phases of coils results in the propagation of an electromagnetic wave along the travel direction. This circuit works well to provide passive centering and active propulsion from the same coil elements. In this arrangement both legs of each coil interact with the magnetic flux of the passing magnetic arrays, and the fraction of total conductor volume that is active is between 30 and 50% depending on the exact geometries. The primary advantages of this arrangement are the higher conductor utilization and a more compact transverse dimension leading to a more compact overall modular block, which enables tighter switching. If the length of the modular block is chosen to be an integer multiple of the length of a group of three coils, i.e. an integer multiple of the wavelength of the bogie magnetic array, then the coil array can be made to terminate bluntly and can be directly abutted to the coil arrays of the next modular block without the requirement of interleaving coil legs in successive blocks.

Modular Guideway Block Communication

A centralized management system in the networked guideway transit system may include a higher level control system (central controller) that determines the appropriate velocity for the particular vehicle at that location on the guideway and that communicates the control signal including the velocity/frequency information to the modular guideway blocks in the vicinity. The modular guideway blocks may be configured to communicate through the guideway to a local computer located within or upon the guideway, or within any of the modular blocks, and a central management system computer via a network. The network may be any suitable network for operating the networked guideway transit system, including, but not limited to a network having optical links. The modular guideway blocks may be configured to communicate to adjacent modular guideway blocks.

The number of modular guideway blocks receiving the control signals for a vehicle may depend on the size of the control envelope surrounding each vehicle in that portion of the track. The control envelope may be defined as the number of modular blocks dedicated to the control of a single vehicle. If the total vehicle bogie spans approximately six modular blocks, six is the minimum number of modular guideway blocks receiving the velocity/frequency signal for each vehicle and six modular blocks would be the minimum size of the control envelope. In most cases, the control envelope may be larger than this minimum size in order to reduce the number of control envelopes and to reduce control complexity. It may be advantageous to vary the size of the control envelope depending on the particular requirements and capabilities of a particular portion of a guideway system at a particular time. By being able to address specific control elements down to the level of the modular block, the size of the control envelope and the resulting minimum headway between successive vehicles can be dynamically managed. This is an advantage in system implementation where capacities can start small and grow without the need for retrofit of modular block hardware.

In some embodiments, only when a modular guideway block detects that the block itself is fully within the magnetic array of a bogie, and when directed by a local or centralized control computer the modular guideway block generates drive signals to its coil array. In this way, the system may avoid unnecessary power expenditure to coils not actively engaged with a vehicle bogie.

In one embodiment, the higher level control system may control vehicle velocity using predetermined drive frequencies based on desired velocity at any given point (coarse control). A common velocity control signal can be sent to all the blocks in a section to synchronize frequency and phase. Thus, the blocks that receive the common velocity control signal may act together like one super block.

Although the described embodiments are explained herein in conjunction with the higher level control system, it is contemplated that the velocity control signal can be generated either by the higher level control system (central control system) or a control unit in a modular guideway block. It is further contemplated that the velocity control signal or the velocity information can be preprogrammed into the modular guideway blocks. It is noted that the velocity is not necessarily constant. For example, in a section where acceleration is desired the modular guideway blocks may be preprogrammed velocity profiles to match the acceleration desired at their individual locations.

The velocity control signal may be a high level signal that can be of several forms and transmission media, including, but not limited to, an analog voltage on a wire, an internet protocol on an optical fiber, and a wireless signal. Those details are not critical to the function and thus are omitted. The modular guideway block translates the velocity control signal into a frequency drive signal. The frequency drive signal is a group of pulse width modulated signals (typically six) that together activate a group of high speed, high power switches within each modular guideway block. In a preferred embodiment, a switch component may be located in very close proximity to the drive coils in the modular guideway block and is connected to the drive coils via electrical conductors of sufficient current carrying capacity. The switch components synthesize a polyphase AC power signal of the desired frequency and amplitude, and this polyphase power is fed to the polyphase motor coil arrays. In such a case, at least three phases operating together produce a propagating electromagnetic wave within the coil arrays.

In some embodiments, in the modular guideway block, a local feedback system may be used to determine and control the relative phase relationship between the traveling electromagnetic wave within the coil arrays and the traveling magnetic fields of the moving magnet arrays on the vehicle bogie. In other words, a local control loop modulates amplitude to maintain fine position control. Maintaining fine position control is important to create centering forces and propulsion forces simultaneously. (In the absence of any active drive signals the coils will continue to passively center the vehicle anyway.) In this embodiment, the coils outside the excitation fields of the magnets (and thus without the back electromotive force (EMF) required for efficient operation) do not need to be energized. This enables the electrical efficiency of the overall motor to be maintained at a relatively high level.

Drive Current Control

A drive current control subsystem (e.g., drive module 449) is used to correctly drive the magnetic array without producing undesirable lateral destabilization. The drive current control subsystem may control the timing and amplitude of the applied external voltage. Without such control, the drive currents may interact with the magnetic array in a way that attracts the magnetic array toward the coils. Because the magnitude of the attraction increases as the magnetic array moves closer to the current carrying coils, the uncontrolled arrangement may be laterally unstable.

By controlling the application of the drive voltage so that its timing matches a favorable timing of the passing magnetic wave, there are additional benefits. First, the attraction of the magnetic arrays to the coils can be neutralized or even changed to a repulsion. This is a stable arrangement with the magnetic array being pushed away from both sides of the coil array so that the magnetic array tends to find the center of the path. Second, the applied drive voltage is closely matched to the back electromotive force (EMF) within the coil phases produced by the passing magnetic array. The applied voltage is in phase with the back EMF of the coils. This may increase the drive force per unit of coil current and keep the force direction positive throughout the entire electrical cycle, thus increasing the electrical efficiency of the motor. FIG. 10B depicts a graph illustrating the applied voltage that is not controlled with respect to the EMF generated by the passing magnetic array. The magnetic array may chase the coil generated waveform and overshoot the ideal position resulting in non-optimal phase relationships. The back EMF leads the applied voltage. As shown in FIG. 10B, the force per phase is not uniformly positive. Even though the summed force over three phases will produce a constant force magnitude, within each phase there are periods in which the force is negative.

Figure 10A:
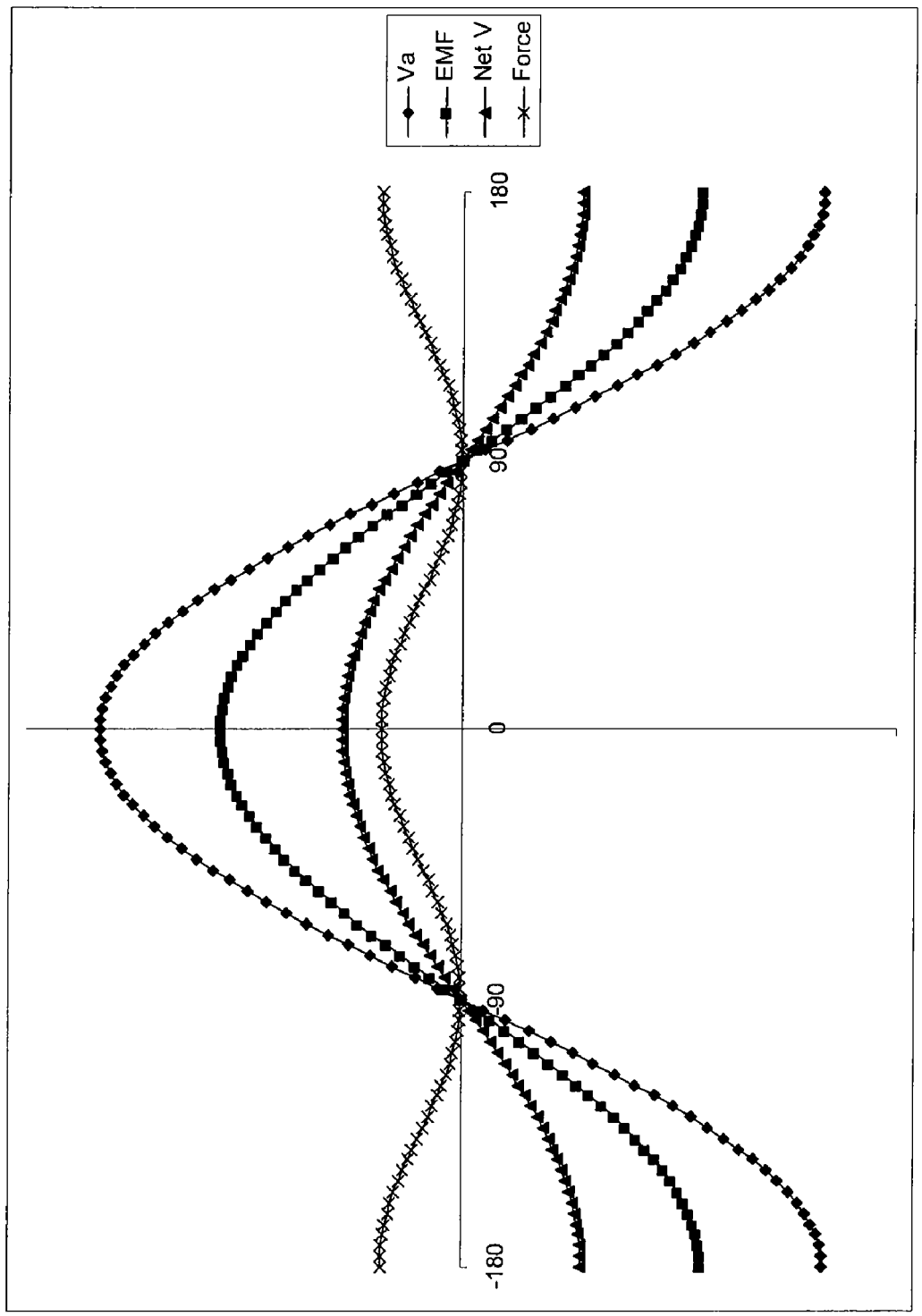
FIGS. 10A-10B are graphics depicting the voltage applied to the motor coils of the modular guideway block with respect to the electromotive force (EMF) generated by magnetic array of the bogie.
Figure 10B:
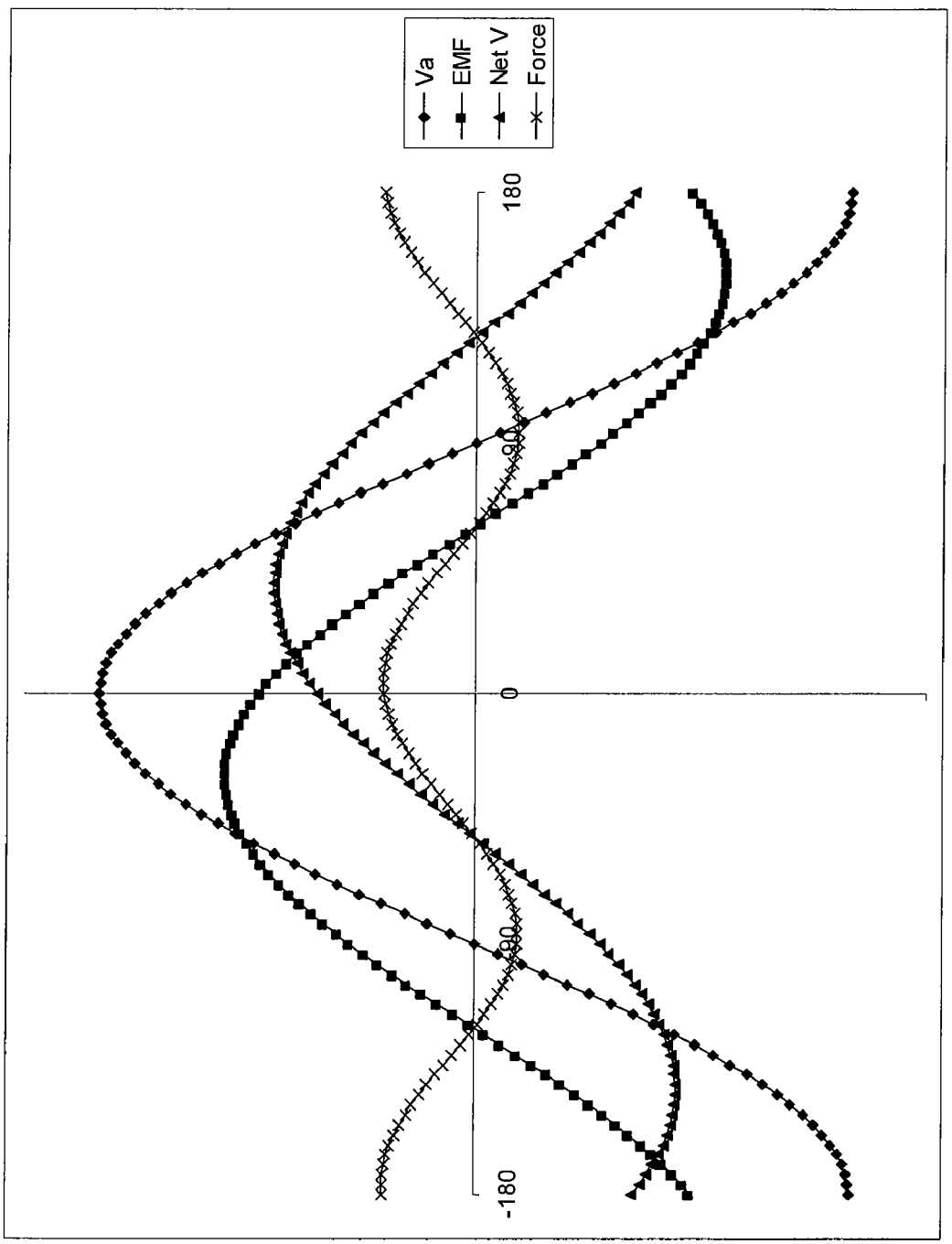

FIG. 10A depicts a graph illustrating the applied voltage that is timed to be in phase with the EMF. The drive circuit/module 449 (FIGS. 7D-7F) for each modular guideway block has at its core a high speed switch component (not shown) connected to a DC bus. This switch component may function as an inverter to produce three phase sinusoidal AC from the DC bus. The amplitude, frequency and phase (starting phase) can be independently modulated by the drive circuit 449. The frequency of modulation of these parameters is high, making possible fast adjustments. A motor used in some embodiments is a linear synchronous motor, meaning the passing magnetic fields of the vehicle and the traveling generated magnetic wave have the same speed and frequency. As will be appreciated, frequency of the generated wave controls the velocity of the vehicle. The vehicle may track the traveling magnetic wave to within a small fraction of one cycle. Thus, there is a fixed relationship between generated frequency and vehicle velocity. For example, the wavelength of the coil array and the magnetic array is 100 mm so the velocity in meters per second is $\frac{1}{10}$ the applied drive frequency in hertz.

In one embodiment, the length of a modular guideway block may be an integer multiple of the wavelength of the magnetic array. In this embodiment, all blocks within the envelope may energize with proper phase coherency and the traveling magnetic wave may transit the boundaries between modular guideway blocks without disruption. Thus, the vehicle bogie detects a contiguous set of traveling magnetic waves irrespective of the transition across any number of modular blocks. In some embodiments, the vehicle bogie may span at least five to six modular guideway blocks. The total length of energized coils remains constant as long as the modular guideway block at the leading edge is switched on at the same time the modular guideway block at the trailing edge is switched off.

As stated above, each modular guideway block has the capability to detect the presence of a bogie or bogie segment. Each modular guideway block also has the capability to obtain magnetic pole position information by detecting the position of the poles of the passing magnetic array relative to the position of the traveling magnetic wave. It is noted that there are many ways to obtain such magnet pole position information. One exemplary way may be using discrete sensors such as Hall effect or optical triggers. Another exemplary way may be using a secondary coil winding that produces a voltage analog of the passing magnetic fields. Using the magnet pole position information, a modular block compares the phase(s) of the applied drive voltage(s) and traveling wave with the phase of the passing magnetic array. Subsequently, the drive circuit/module 449 (FIGS. 7D-7F) modulates the amplitude of the applied drive voltage, which modulates the drive force on the bogie and vehicle. If the bogie is positioned too far back in comparison to the applied drive voltage that voltage is increased to push the bogie forward. If the bogie is too far forward the amplitude is dropped so that the inherent drag forces will act to slow the bogie and vehicle. If the drag forces are inadequate, for example on a downhill grade, the amplitude of the applied voltage will drop below the back EMF produced by the coils. In that case, current flows opposite the applied voltage and the coils actually deliver electrical energy back to the DC bus while kinetic energy is extracted from the vehicle, causing it to slow. In some instances, the applied voltage can even be of opposite polarity than the back EMF producing a very strong slowing force on the vehicle. With fast enough modulation of the applied voltage, the bogie position is maintained at an ideal phase range on the traveling magnetic wave.

The required velocity and frequency information are determined by the higher level control system. Such frequency information may be communicated to modular blocks that encompasses the position of the vehicle/bogie, either directly or via neighboring modular guideway blocks. Those modular guideway blocks that detect full engagement with the magnetic array of the bogie energize their coils with three phase sinusoidal currents creating a traveling magnetic wave. The traveling magnetic wave interacts with the magnetic fields of the moving magnetic array to produce propulsion and centering. A fine position sensor or sensors 490 (FIG. 4A) within each modular guideway block determine the phase relationship between the traveling wave and the moving magnets. The amplitude of the applied voltage is modulated to control the force on the bogie and thus modulates the phase relationship. During all this, the motor coils function passively as centering elements by using induced voltages to produce internal currents within the motor coils.

It is advantageous for the drive current control subsystem to remain fully functional in the event of a failure of one or more modular guideway blocks along a section of guideway. Because the length of each modular guideway block is a fraction of the total energized length of the guideway at any one time, in most cases the loss of propulsion power from a single modular block may not cause a significant detriment to the quality of service delivered to the vehicle. This is because adjacent modular block may make up for the loss in total force due to the loss of a single module.

Modular Guideway Construction

Modular guideway block construction will be discussed in greater detail. The modular guideway blocks are built in such a way that each modular guideway block can be individually withdrawn from the guideway structure without disturbing other blocks. One way that this capability is enabled is that the PMR (permanent magnet repulsion) lifting components can accommodate small gaps in their surfaces because the magnetic fields absorb the irregularities. This is in contrast to a vehicle using a wheel suspended system where the gaps would have to be filled or the wheels would have to be large to avoid serious degradation to ride quality. In addition, the relatively short length of each guideway module means that any one module can malfunction, e.g., lose propulsion power, without interrupting the ability of the guideway to carry bogies and hence vehicles through that section. The relatively short length of a guideway module also means a relatively small mass per module, which means easier construction and service because heavy lifting equipment is not required to place or remove the modules.

It is noted that the use of modular blocks of short length in comparison to the vehicle (or bogie) length has an important performance attribute in that there will always be a multitude of blocks within the guideway space occupied by and magnetically excited by the vehicle or bogie components. This means that by switching off a block near the tail end of the vehicle and simultaneously switching on a block near the leading edge, the total volume of electromagnetically active coil remains approximately constant. Thus, the force delivered to the vehicle and the power drawn from the guideway also remain approximately constant, without the need for complicated modulation of the voltages and currents being provided to the active blocks. In order to make this possible and to maintain the ability to remove individual blocks for service, the above-described motor coils (with reference to FIGS. 8C and 9C) that do not interleave with the motor coils of adjacent blocks are used in some embodiment.

Referring back to FIG. 1B, the structural beams 122 that support and partially enclose the modular guideway blocks 110 also contain power and communication cabling or buses 502, 503 (FIG. 5) When a modular guideway block 110 is inserted vertically into the beam 122, an electrical coupling or connection is made between the element and the buses. When a modular guideway block 110 is removed, the connection or coupling is automatically broken. The connection or coupling can be the result of an electromechanical, electro-optical, electromagnetic device or process, or other suitable form of electrical connection or coupling. In addition, in some embodiments, a modular guideway block can communicate and/or transfer data with adjacent modular guideway blocks, also as a result of connections or couplings that are engaged by the insertion of the blocks. Note that in terms of construction, a beam or channel can be preloaded with modules at a factory or they can be erected empty and the modules can be inserted in the field.

Modular guideway block construction further enables factory mass production and the resulting improvements in cost and reliability. Modular construction also enables rapid trouble shooting and repair of damage. Further, modular construction enables power delivery down to a fine grain of detail, i.e. individual blocks can be switched on independently, for high electrical efficiency and the ability to independently power vehicles in close proximity to each other.

In one embodiment, each modular guideway element can be provided with a globally unique identifier that may be a digital identifier character, string of character, or the like. Such an identifier may be used in numerous ways. Uses of such a module identification scheme include, but are not limited to, the following:

flagging trouble spots—a block can send messages back to a monitoring center in the event detecting an error in operation;

navigation—a bogie or vehicle can read a digital identifier and use it as a geographic address;

manufacturing and licensing control—a system can be programmed to flag modular guideway blocks with missing or incorrect identifiers; and construction quality assurance—the identifier can be configured to carry or be associated with information about the block type so that a block could not be accidentally placed in the wrong section of the guideway.

mapping a bogie in a particular geographical area such as a street or a town—the system can obtain advertisement information targeting such geographical area and provide the advertisement information to the vehicle attached to the bogie.

communication—each modular block can identify neighboring modular blocks based on their identifiers for communicating the control signals.

As will be appreciated, controlling the motion of vehicles in close proximity to each other is difficult with independently powered guideway sections of long length. Breaking the control down to the modular guideway block level greatly enhances the ability to independently control vehicles in close proximity to each other without risking thrust ripple as each vehicle transitions between elements. In some embodiments, the elements are sufficiently smaller than the vehicle length so that a number of them are always immersed in the vehicle's magnetic fields. By switching off the rear element while simultaneously switching on the next element the total active motor length stays constant and the resulting force stays constant without the need for elaborate modulation schemes.

In an advantageous aspect of some embodiments, when the drive coils become sufficiently short relative to the length of the driven vehicle, for example when the drive coil elements (which are contained in the modular guideway blocks) are less than one half the length of the total vehicle bogie propulsion magnet array 202 (FIGS. 7A-7F), a constant length of active and fully engaged coils can be maintained under the bogie. As discussed above, this configuration may significantly eliminate electrical inefficiencies and potential thrust ripple. As such, the switching on and switching off of coils (or effectively, the switching on and off of the drive or propulsion function for a modular guideway block) may produce a smooth propulsion force on the vehicle. Additional benefit of this configuration is that vehicles can be individually controlled even when in close proximity to each other.

While illustrative embodiments have been illustrated and described, it will be appreciated that various changes can be made therein without departing from the spirit and scope of the invention.

What is claimed is:

1. A transportation system for at least one magnetically levitated vehicle, comprising:
    a vehicle bogie comprising a plurality of segments, wherein each vehicle bogie segment includes a linear motor drive component configured at least to provide an acceleration force or a deceleration force to the vehicle bogie, a magnetic levitation component configured at least to provide a lifting force to the vehicle bogie, and an electrodynamic repulsion component configured at least to maintain an alignment between the magnetic levitation component of the vehicle bogie segment and a magnetic levitation component of a modular guideway block;
    a vehicle connectively coupled with and suspended beneath the vehicle bogie;
    a guideway comprising a plurality of modular guideway blocks, wherein each modular guideway block has an open bottom vehicle bogie enclosure that facilitates suspension of the vehicle beneath the vehicle bogie and each modular guideway block further comprises
        a linear motor drive component configured at least to provide an acceleration force or a deceleration force to the vehicle bogie;
        a drive circuit component configured at least to generate a drive signal and to control a drive current within the guideway modular block linear motor drive component;
        a permanent magnet levitation component configured at least to provide a lifting force to the vehicle bogie; and
        an electrodynamic repulsion component configured at least to maintain an alignment between the guideway block magnetic levitation component and a magnetic levitation component of a vehicle bogie segment; and
    a controller configured at least to control the movement of the vehicle at least in part by
        determining that a vehicle bogie segment linear motor drive component is located within a modular guideway block and in response energizing modular guideway block linear motor coils to provide kinetic energy to, or extract kinetic energy from, the vehicle bogie, and energizing the modular guideway block linear motor coils to provide a centering force for the vehicle bogie.

2. The system of claim 1, wherein groups of coil components in the modular guideway block linear motor drive component are laterally paired and located opposite to each other.

3. The system of claim 1, wherein axes of coils in the modular guideway block linear motor component are oriented substantially parallel to a long axis of the guideway.

4. The system of claim 1, wherein axes of coils in the modular guideway block linear motor component are oriented substantially perpendicular to a long axis of the guideway.

5. A method of operating a transit guideway to convey at least one magnetically levitated vehicle, comprising:
    operating a vehicle bogie, wherein the vehicle bogie is comprised of a plurality of segments and beneath which a vehicle is suspended, wherein each vehicle bogie segment comprises
        a linear motor drive component operative to provide an acceleration force or a deceleration force to the vehicle bogie, a magnetic levitation component operative to provide a lifting force to the vehicle bogie, and an electrodynamic repulsion component operative to maintain an alignment between the magnetic levitation component of the vehicle bogie segment and a magnetic levitation component of a modular guideway block;
    operating the guideway, wherein the guideway comprises a plurality of modular guideway blocks, wherein each modular guideway block has an open bottom vehicle bogie enclosure that facilitates suspension of the vehicle beneath the vehicle bogie and each modular guideway block further comprises
        a linear motor drive component operative to provide an acceleration force or a deceleration force to the vehicle bogie;
        a drive circuit component operative to generate a drive signal and to control a drive current within the guideway modular block linear motor drive component;
        a permanent magnet levitation component operative to provide a lifting force to the vehicle bogie; and
        an electrodynamic repulsion component operative to maintain an alignment between the guideway block magnetic levitation component and a magnetic levitation component of a vehicle bogie segment;
    determining that a vehicle bogie segment linear motor drive component is located within a modular guideway block and controlling the energizing of the modular guideway block linear motor coils to provide kinetic energy to, or extract kinetic energy from, the vehicle bogie; and controlling the energizing of the modular guideway block linear motor coils to provide a centering force for the vehicle bogie.

6. The method of claim 5, wherein the drive circuit component controls an applied voltage by modulating an amplitude, a frequency or a phase of the voltage, and further, wherein propulsion currents within the guideway modular block linear motor component are timed to provide kinetic energy to, or extract kinetic energy from, the moving vehicle bogie while also providing centering forces to the vehicle bogie.

7. The method of claim 6, wherein the modulated frequency controls the velocity of the vehicle bogie.

8. The method of claim 5, wherein phases of coil components of the guideway modular block are energized in succession to produce a traveling magnetic wave, and the currents within the electrodynamic repulsion component of the guideway modular block are timed to create a magnetic field that at least partially opposes a magnetic field of the moving vehicle bogie, thus providing centering forces on the moving vehicle bogie while simultaneously providing kinetic energy to, or extracting kinetic energy from, the moving vehicle bogie.

9. The method of claim 5, further comprising:
providing each modular guideway block with a globally unique identifier; and
using the globally unique identifier to functionally disable a guideway modular block if the globally unique identifier is not verified by a transit system controller.

10. The method of claim 5, further comprising:
providing each modular guideway block with a globally unique identifier; and
using the globally unique identifier to determine a location of a vehicle.

11. The method of claim 10, further comprising providing content to a user of the vehicle based on the location of the vehicle.

12. The method of claim 11, wherein the content is an advertisement.

13. The method of claim 5, wherein the open bottom vehicle bogie enclosure is closed at the top and the operation of the permanent magnet levitation component is thereby facilitated at least in part due to a foreign material reduction.

14. A guideway for at least one magnetically levitated vehicle, the guideway comprising a plurality of similar guideway modules, each of the guideway modules having a length in a direction of travel of a vehicle bogie such that multiple guideway module lengths are contained within a corresponding length of the vehicle bogie, each of the guideway modules having an open bottom vehicle bogie enclosure that facilitates suspension of a vehicle beneath the vehicle bogie, and each of the guideway modules incorporating, at least:
a permanent magnet levitation component configured at least to provide a lifting force to the vehicle bogie;
a linear motor drive component configured at least to provide an acceleration force or a deceleration force to the vehicle bogie;
a drive circuit component configured at least to generate a drive signal that controls a drive current with the linear motor drive component of the modular guideway block; and
an electrodynamic repulsion component configured at least to maintain an alignment between the permanent magnet levitation component of the modular guideway block and at least one corresponding permanent magnet levitation component of the vehicle bogie.

15. The guideway of claim 14, wherein the shape of each guideway module further facilitates switching of the vehicle bogie between multiple tracks of a transit network that includes the guideway with magnetically-induced forces and independent of guideway movement.

16. The guideway of claim 14, wherein a minimum distance between a plurality of successive vehicles traveling independently in a transit network that includes the guideway depends at least in part on the length of at least one of the plurality of similar guideway modules in the direction of travel of the plurality of successive vehicles.

17. The guideway of claim 14, wherein a minimum distance between a plurality of successive vehicles traveling independently in a transit network that includes the guideway depends at least in part on a size of a control envelope of guideway modules around at least one of the plurality of successive vehicles.

18. The guideway of claim 17, wherein the size of the control envelope of guideway modules is a multiple of the length of at least one of the plurality of similar guideway modules in the direction of travel of the plurality of successive vehicles.

19. The guideway of claim 14, wherein the permanent magnet levitation component is located within the open bottom vehicle bogie enclosure.

20. The guideway of claim 14, wherein the electrodynamic repulsion component is located within the open bottom vehicle bogie enclosure.

* * * * *